(12) United States Patent
Turner et al.

(10) Patent No.: US 12,003,563 B2
(45) Date of Patent: Jun. 4, 2024

(54) SEAMLESS TRANSITIONS BETWEEN MEDIA MODES

(71) Applicant: QUALCOMM Incorporated, San Diego, CA (US)

(72) Inventors: Richard Turner, Belfast (GB); Laurent Wojcieszak, Belfast (GB); Derrick Rea, Broughshane (GB); Raghavendra Bhat Noojady Krishna, San Diego, CA (US); Bharath Kumar Tirunagaru, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/952,109

(22) Filed: Sep. 23, 2022

(65) Prior Publication Data

US 2024/0106881 A1 Mar. 28, 2024

(51) Int. Cl.
*G06F 13/00* (2006.01)
*H04J 3/06* (2006.01)
*H04L 65/65* (2022.01)

(52) U.S. Cl.
CPC ............ *H04L 65/65* (2022.05); *H04J 3/0632* (2013.01)

(58) Field of Classification Search
CPC .............................. H04L 65/65; H04J 3/0632
USPC ........ 709/231, 232–234, 248, 236, 213–214, 709/217–219
See application file for complete search history.

(56) References Cited

U.S. PATENT DOCUMENTS

| | | |
|---|---|---|
| 2002/0103919 A1 | 8/2002 | Hannaway |
| 2011/0124300 A1 | 5/2011 | Sinai |
| 2017/0034263 A1* | 2/2017 | Archambault .......... G06F 3/165 |
| 2019/0104424 A1 | 4/2019 | Hariharan et al. |
| 2021/0195256 A1 | 6/2021 | Bouvigne |
| 2022/0103948 A1 | 3/2022 | Kumar et al. |

FOREIGN PATENT DOCUMENTS

| | | |
|---|---|---|
| EP | 2795866 B1 | 9/2018 |
| WO | WO-2022073153 A1 | 4/2022 |
| WO | 2023146565 A1 | 8/2023 |

OTHER PUBLICATIONS

International Search Report and Written Opinion—PCT/US2023/033045—ISA/EPO—Jan. 13, 2024.

* cited by examiner

*Primary Examiner* — Kenneth R Coulter
(74) *Attorney, Agent, or Firm* — Holland & Hart LLP

(57) ABSTRACT

Methods, systems, and devices for wireless communications are described. In a wireless audio system, a first wireless device may generate a first media stream associated with a first media mode and a second media stream associated with a second media mode, buffer the first media stream in accordance with a first latency time value for adjusting a first latency time of the first media stream and buffering the second audio stream, independently from the first media stream, in accordance with a second latency time value for adjusting a second latency time of the second media stream, and transmit a mixed media stream including the buffered first media stream mixed with the buffered second media stream to a second wireless device.

22 Claims, 14 Drawing Sheets

SEAMLESS TRANSITIONS BETWEEN MEDIA MODES

BACKGROUND

The following relates to wireless communications, including seamless transitions between media modes, such as audio or/and video modes.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a WLAN, such as a Wi-Fi (i.e., Institute of Electrical and Electronics Engineers (IEEE) 802.11) network may include AP that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via DL and UL. The DL (or forward link) may refer to the communication link from the AP to the station, and the UL (or reverse link) may refer to the communication link from the station to the AP.

In some wireless audio systems, a wireless device (e.g., a STA) may transmit a wireless audio signal to another wireless device, such as a wireless earbud, a wireless headset or the like, or in general to an audio sink device. The wireless audio may be associated with multiple audio streaming modes for different operations, as further elucidated in the following, and a user may transition between the multiple audio streaming modes (e.g., the user may switch between different audio modes using the wireless device). In some examples, however, transitioning between the multiple audio streaming modes may result in increased latency and in distortion of the audio signal.

SUMMARY

The described techniques relate to improved methods, systems, devices, or apparatuses that support seamless transitions between media modes. In particular, the media modes may include a high quality (HQ) audio streaming mode that may have a high bit rate and a streaming mode that may have a lower quality with a lower bit rate, such as a gaming audio streaming mode. The gaming mode may in particular have a lower latency as compared to the HQ audio mode and thus also be referred to as low-latency mode in some instances. Media may in general refer to audio or/and video in the following. Examples of the present disclosure referring to audio likewise apply to video or other type of media and the explanations are not limited to audio in said respect in the following.

Generally, the described techniques may provide for implementing a media system modification, such as an audio system modification by in particular classifying the HQ audio streaming mode and the gaming audio streaming mode as two separate audio streams. To decrease latency and to maintain audio quality, an audio source device and an audio sink device may separate the HQ mode (e.g., HQ audio streaming mode) and the gaming mode (e.g., gaming audio streaming mode) into two audio streams, which may result in distortion-less transmission. In some examples, the audio source device may operate in accordance with a dual-audio mode (e.g., an audio mode supporting the HQ audio stream and the gaming audio stream) and communicate audio to the audio sink device in the dual-audio mode. In some examples, the audio source device may use a buffer to adjust the latency time of at least one of the two audio streams. In some examples, the audio source device may use a mixer and an encoder to implement an overlap add (OLA) packet. The OLA packet may overlap a first media stream with a second media stream while refraining from synthesizing the two media streams, which may allow for the separate output of the two streams. In some examples, the audio source device may use the OLA packet to adjust the latency and sample rates of the two streams separately, which may result in a high quality of the audio signal and seamless transition between the two audio modes. Additionally, or alternatively, the audio source device may support transitioning out of the dual-audio mode to a single audio mode to increase efficiency.

A method for wireless communication at a first wireless device is described. The method may include generating a first media stream associated with a first media mode and a second media stream associated with a second media mode, buffering the first media stream in accordance with a first latency time value for adjusting a first latency time of the first media stream and buffering the second media stream, independently from the first media stream, in accordance with a second latency time value for adjusting a second latency time of the second media stream, and transmitting a mixed media stream including the buffered first media stream mixed with the buffered second media stream to a second wireless device.

An apparatus for wireless communication at a first wireless device is described. The apparatus may include a processor, memory coupled with the processor, and instructions stored in the memory. The instructions may be executable by the processor to cause the apparatus to generate a first media stream associated with a first media mode and a second media stream associated with a second media mode, buffer the first media stream in accordance with a first latency time value for adjusting a first latency time of the first media stream and buffering the second media stream, independently from the first media stream, in accordance with a second latency time value for adjusting a second latency time of the second media stream, and transmit a mixed media stream including the buffered first media stream mixed with the buffered second media stream to a second wireless device.

Another apparatus for wireless communication at a first wireless device is described. The apparatus may include means for generating a first media stream associated with a first media mode and a second media stream associated with a second media mode, means for buffering the first media stream in accordance with a first latency time value for adjusting a first latency time of the first media stream and buffering the second media stream, independently from the first media stream, in accordance with a second latency time value for adjusting a second latency time of the second media stream, and means for transmitting a mixed media stream including the buffered first media stream mixed with the buffered second media stream to a second wireless device.

A non-transitory computer-readable medium storing code for wireless communication at a first wireless device is described. The code may include instructions executable by a processor to generate a first media stream associated with a first media mode and a second media stream associated with a second media mode, buffer the first media stream in accordance with a first latency time value for adjusting a first latency time of the first media stream and buffering the second media stream, independently from the first media stream, in accordance with a second latency time value for adjusting a second latency time of the second media stream, and transmit a mixed media stream including the buffered first media stream mixed with the buffered second media stream to a second wireless device.

Some examples of the method, apparatuses, and non-transitory computer-readable medium described herein may further include operations, features, means, or instructions for terminating the second media stream associated with the second media mode and increasing, in response to terminating the second media stream, a latency of the first independent media stream.

Some examples of the method, apparatuses, and non-transitory computer-readable medium described herein may further include operations, features, means, or instructions for terminating the first media stream associated with the first media mode and transitioning from operating in a dual-media mode in which the first media stream and the second media stream may be classified as independent from each other to operating in a single media mode based on terminating the first media stream.

Some examples of the method, apparatuses, and non-transitory computer-readable medium described herein may further include operations, features, means, or instructions for mixing, after the buffering, the first media stream at a first sample rate and the second media stream at a second sample rate and jointly encoding the mixed first media stream and the second media stream.

Some examples of the method, apparatuses, and non-transitory computer-readable medium described herein may further include operations, features, means, or instructions for setting the first latency time value associated with the first media stream based on the first sample rate and resizing and shifting the second media stream between a transmission state at the first wireless device and an encoder input at the first wireless device.

Some examples of the method, apparatuses, and non-transitory computer-readable medium described herein may further include operations, features, means, or instructions for inserting an overlap add packet block into the first media stream and the second media stream prior to the mixing, where the overlap add packet block may be associated with transitioning from operating in a dual-media mode in which the first media stream and the second media stream may be classified as independent from each other to operating in a single media mode. In some examples, the overlap add packet block may be used to switch a sample rate of one or both media streams so that the sample rate of first media stream matches the sample rate of the second media stream.

In some examples of the method, apparatuses, and non-transitory computer-readable medium described herein, mixing the first media stream and the second media stream may include operations, features, means, or instructions for mixing the first media stream and the second media stream at a third sample rate prior to the mixing.

Some examples of the method, apparatuses, and non-transitory computer-readable medium described herein may further include operations, features, means, or instructions for refraining from jointly encoding the first media stream and the second media stream for a duration of the second latency time value.

Some examples of the method, apparatuses, and non-transitory computer-readable medium described herein may further include operations, features, means, or instructions for disabling a first target wake time associated with the first media stream prior to mixing the first media stream at a first sample rate and the second media stream at a second sample rate, enabling a second target wake time associated with the first media stream, and mixing the first media stream and the second media stream based on the second target wake time.

Some examples of the method, apparatuses, and non-transitory computer-readable medium described herein may further include operations, features, means, or instructions for enabling the second target wake time associated with the first media stream and encoding the first media stream based on the second target wake time.

In some examples of the method, apparatuses, and non-transitory computer-readable medium described herein, the first media mode includes a high quality mode and the second media mode includes a low-latency mode.

In some examples of the method, apparatuses, and non-transitory computer-readable medium described herein, the first wireless device includes a media source device and the second wireless device includes a media sink device.

DETAILED DESCRIPTION

Figure 1:
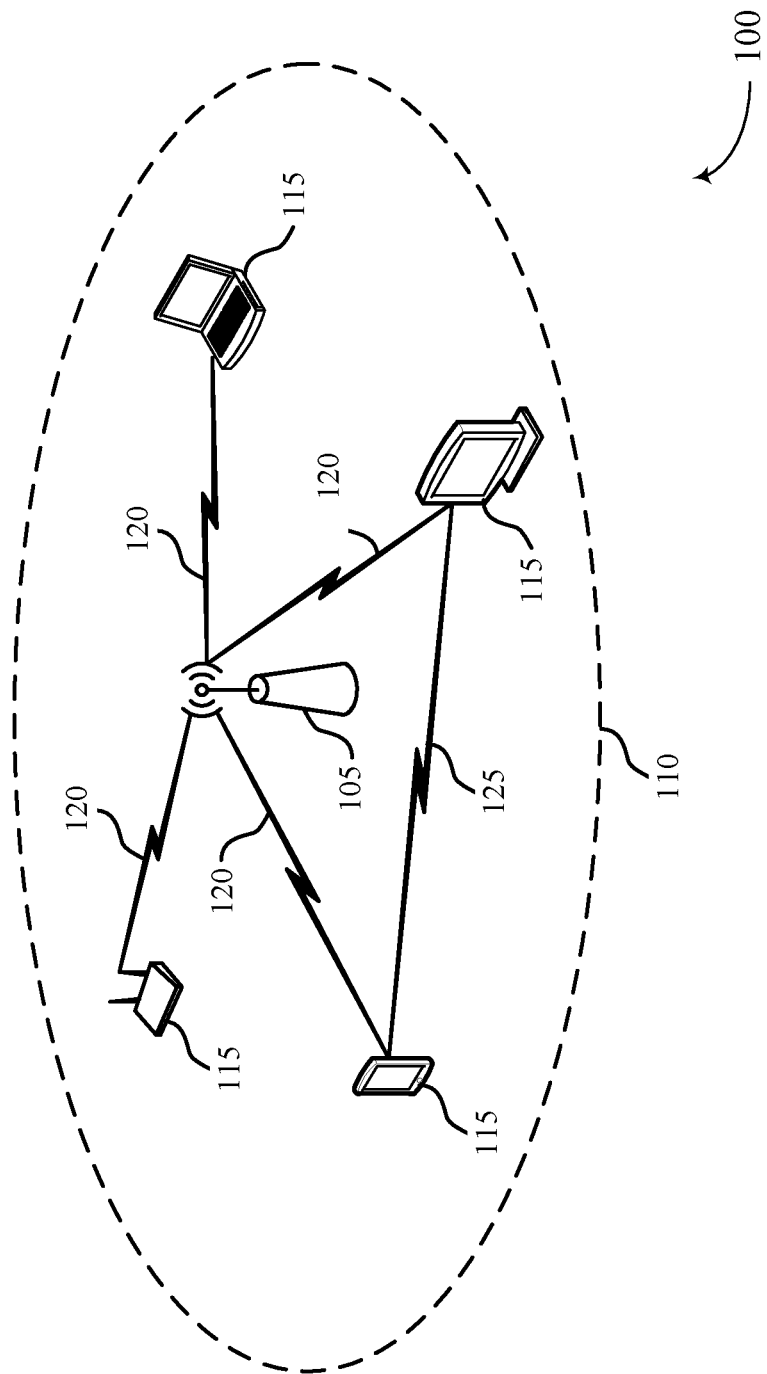
FIG. 1 illustrates an example of a wireless communications system that supports seamless transitions between media modes in accordance with aspects of the present disclosure.

In some wireless audio systems, a wireless device (e.g., an audio source device) may transmit a wireless audio signal to an audio sink device (e.g., a wireless earbud). The audio signal may be associated with multiple audio streaming modes used for different operations (e.g., music, gaming, etc.), which may be associated with different quality levels, such as different bit rates, sampling rates, different latency levels and/or different levels of error correction coding. In some examples, a user may switch between two audio (e.g., media) modes, such as a high quality (HQ) mode and a gaming mode, and accordingly, the audio sink device may transition between the two audio modes. For example, the audio source device may use a mixer to mix audio streams associated with the two audio modes and an encoder may output the audio signal to an earphone. The HQ stream may be associated with high quality audio, and the gaming stream may be associated with low latency. Switching between the two audio streams may result in increased latency. In some examples, the audio source device may decrease the latency associated with switching between the two audio streams, however, decreasing the latency may result in lowering the quality of the audio signal and in causing audio distortion.

Techniques, systems, and devices described herein enable an audio source device and an audio sink device to implement an audio system modification in particular by classifying the audio associated with the HQ mode and the gaming mode as two separate audio streams. In some examples, the audio source device may separate the HQ mode and the gaming mode into two audio streams, which may result in distortion-less transmission. The audio source device may operate in accordance with a dual-media mode (e.g., audio mode supporting HQ audio stream and gaming audio stream). In some examples, the audio source device may use a buffer to adjust the latency time of at least one of the two audio streams. For example, the audio source device may input the HQ mode as a separate audio stream into a buffer. The audio source device may buffer the HQ audio for a threshold time period prior to encoding the HQ audio with the gaming audio. The audio source device may use the buffer to adjust the latency time of the HQ audio stream, and the audio source device may input the HQ audio stream and the gaming audio stream into the mixer and into the encoder after adjusting the latency. In some examples, the audio source may use the mixer and the encoder to implement an overlap add (OLA) packet. The OLA packet may overlap a first media stream with a second media stream while refraining from synthesizing the two media streams, which may allow for the separate output of the two streams. In some examples, the audio source device may use the OLA packet to adjust the latency and sample rates of the two streams separately, which may result in a high quality of the audio signal and seamless transition between the two audio modes. For example, the overlap add packet block may be used to switch a sample rate of one or both media streams so that the sample rate of first media stream matches the sample rate of the second media stream. Additionally, or alternatively, the audio source device may support transitioning out of the dual-audio mode to a single audio mode. In such cases, the audio source device may increase a transmission rate of the single audio stream such that the buffering is transferred to the audio sink device.

Aspects of the disclosure are initially described in the context of a wireless communications system. Aspects of the disclosure are further illustrated by an audio buffering block diagram, audio streaming mixing schemes, and an audio stream process flow. Aspects of the disclosure are further illustrated by and described with reference to apparatus diagrams, system diagrams, and flowcharts that relate to seamless transitions between audio modes.

FIG. 1 illustrates a wireless local area network (WLAN) 100 (also known as a Wi-Fi network) configured in accordance with various aspects of the present disclosure. The WLAN 100 may include an AP 105 and multiple associated STAs 115, which may represent devices such as mobile stations, personal digital assistant (PDAs), other handheld devices, netbooks, notebook computers, tablet computers, laptops, display devices (e.g., TVs, computer monitors, etc.), printers, etc. The AP 105 and the associated STAs 115 may represent a BSS or an ESS. The various STAs 115 in the network are able to communicate with one another through the AP 105. Also shown is a coverage area 110 of the AP 105, which may represent a BSA of the WLAN 100. An extended network station (not shown) associated with the WLAN 100 may be connected to a wired or wireless distribution system that may allow multiple APs 105 to be connected in an ESS.

Although not shown in FIG. 1, a STA 115 may be located in the intersection of more than one coverage area 110 and may associate with more than one AP 105. A single AP 105 and an associated set of STAs 115 may be referred to as a BSS. An ESS is a set of connected BSSs. A distribution system (not shown) may be used to connect APs 105 in an ESS. In some cases, the coverage area 110 of an AP 105 may be divided into sectors (also not shown). The WLAN 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within WLAN 100.

In some cases, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention based environment (e.g., CSMA/CA) because the STAs 115 may not refrain from transmitting on top of each other. A STA 115 whose transmissions are not identifiable, but that is within the same coverage area 110 may be known as a hidden node. CSMA/CA may be supplemented by the exchange of an RTS packet transmitted by a sending STA 115 (or AP 105) and a CTS packet transmitted by the receiving STA 115 (or AP 105). This may alert other devices within range of the sender and receiver not to transmit for the duration of the primary transmission. Thus, RTS/CTS may help mitigate a hidden node problem.

In some examples, WLAN 100 may support an extended personal area network (XPAN) in which an audio source device (e.g., a wireless device, or a STA 115) transmitting a wireless audio signal to an audio sink device (e.g., a wireless earbud). The audio signal may be associated with multiple audio streaming modes for different operations, such as gaming or music, as elucidated above. In some examples, a user may switch between two audio modes using the audio source device, and the user may transition between a high quality (HQ) mode and a gaming mode. For example, a user may switch from listening to music to starting a game, and the audio in HQ mode may continue to stream (e.g., HQ audio playout may not be stopped). Accordingly, the audio sink device may transition between the two audio modes based on the user's transition. For example, a mixer in the audio sink device and the audio source device may mix audio streams associated with the two audio modes and an encoder may output the audio signal to an earphone. The HQ stream may be associated with high quality audio, and the gaming stream may be associated with low latency. Switching between the two audio streams may result in increased latency. For example, the gaming audio stream may be associated with a quantity of processing time (e.g., 32 milliseconds of controlling application time/20 milliseconds from an audio encoder input to the audio output). Additionally, or alternatively, the HQ audio stream (e.g., lossless audio stream) may be associated with a quantity of processing time (e.g., 250 milliseconds of controlling application time/220 milliseconds after input to the encoder). As a result, different encoders within the audio source device may be associated with different amounts of output latency. For example, the HQ audio stream may be associated with a latency of 220 milliseconds and the gaming audio stream may be associated with a latency of 20 milliseconds. In some examples, the audio sink device may decrease the latency associated with switching between the two audio streams. However, decreasing the latency may result in lowering the quality of the audio signal and in causing audio distortion. For example, a decrease in latency may result in a processing rate change of 2 milliseconds/second, or up to 5 milliseconds/second, resulting in increased (e.g., noticeable audio distortion).

Techniques, systems, and devices described herein enable an audio source device and an audio sink device to implement an audio system modification by classifying the HQ mode and the gaming mode as two separate audio streams. The techniques described herein may result in seamless transition between a lossless audio stream, an HQ audio stream, and a gaming audio stream. The audio source device may adjust the latency associated with each audio stream using an encoder input. It is to be understood that the techniques depicted herein may be applicable to seamless transitions on different communication channels (e.g., Bluetooth).

The audio source device may separate the HQ mode and the gaming mode into two audio streams, which may result in distortion-less transmission. The audio source device may operate in accordance with a dual-audio mode (e.g., audio mode supporting HQ audio stream and gaming audio stream). The audio sink device may generate a first audio signal associated with a first audio mode and a second audio signal associated with a second audio mode. In some cases, the first audio signal and the second audio signal may be generated according to a dual-audio mode such that the first audio signal is classified as a first independent audio stream and the second audio signal is classified as a second independent audio stream. In some examples, the audio source device may use a buffer to adjust the latency time of at least one of the two audio streams (e.g., the audio source device may move the audio buffering between the audio sink device and the audio source device). The audio source device may buffer the first independent audio stream in accordance with a first latency time value and the second independent audio stream in accordance with a second latency time value. For example, the audio source device may input the HQ mode as a separate audio stream into a buffer. The audio source device may use the buffer to adjust the latency time of the HQ audio stream, and the audio source device may input the HQ audio stream and the gaming audio stream into the mixer and into the encoder after adjusting the latency. In some examples, the audio source device may update (e.g., refrain from adjusting) the latency time of the HQ audio stream, and the audio source device may lower the latency time of the gaming audio stream. In this example, the audio source device may resize and shift (e.g., re-shift) the HQ audio stream in time and frequency after decoding the HQ audio stream and prior to encoding the HQ audio stream to transmit to the audio sink device.

In some examples, the audio source may use the mixer and the encoder to implement an OLA packet, which may allow for up-sampling or down-sampling of one or both streams to match the sample rate between the two streams. The OLA packet may also allow for a change for a compression algorithm, a codec, or a filtering of the mixed two streams. In some examples, the audio source device may use the OLA packet to adjust the latency and sample rates of the two streams separately, which may result in a high quality of the audio signal and seamless transition between the two audio modes. In some examples, such as a Wi-Fi interface, the target wake time for the audio sink device may be adjusted based on the transition between the HQ audio mode and the gaming audio mode. The target wake time may be associated with the sampling rate of the two streams, where the target wake time is based on the time during which the decoder and the encoder process each of the streams or both of the streams. In some other examples, such as a Bluetooth (BT) interface, the packet size and the time interval of the audio signal transmission may be adjusted based on the transition between the HQ audio mode and the gaming audio mode. Additionally, or alternatively, the audio source device may support transitioning out of the dual-audio mode to a single audio mode. In such cases, the audio source device may increase a transmission rate of the single audio stream such that the buffering is transferred to the audio sink device. Separating the HQ audio stream and the gaming audio stream may result in gapless and distortion-less transitions between the HQ audio mode and the gaming audio mode within a time window of transition (e.g., 200 milliseconds). Additionally, separating the two audio streams may result in increased efficiency in scheduling the mixing and resampling (e.g., adjusting of the sampling rate) of the two audio streams. For example, the audio source device may maintain the latency time associated with the HQ audio mode while transitioning between audio modes, which may result in a high quality of audio pitch and decreased audio distortion.

Figure 2:
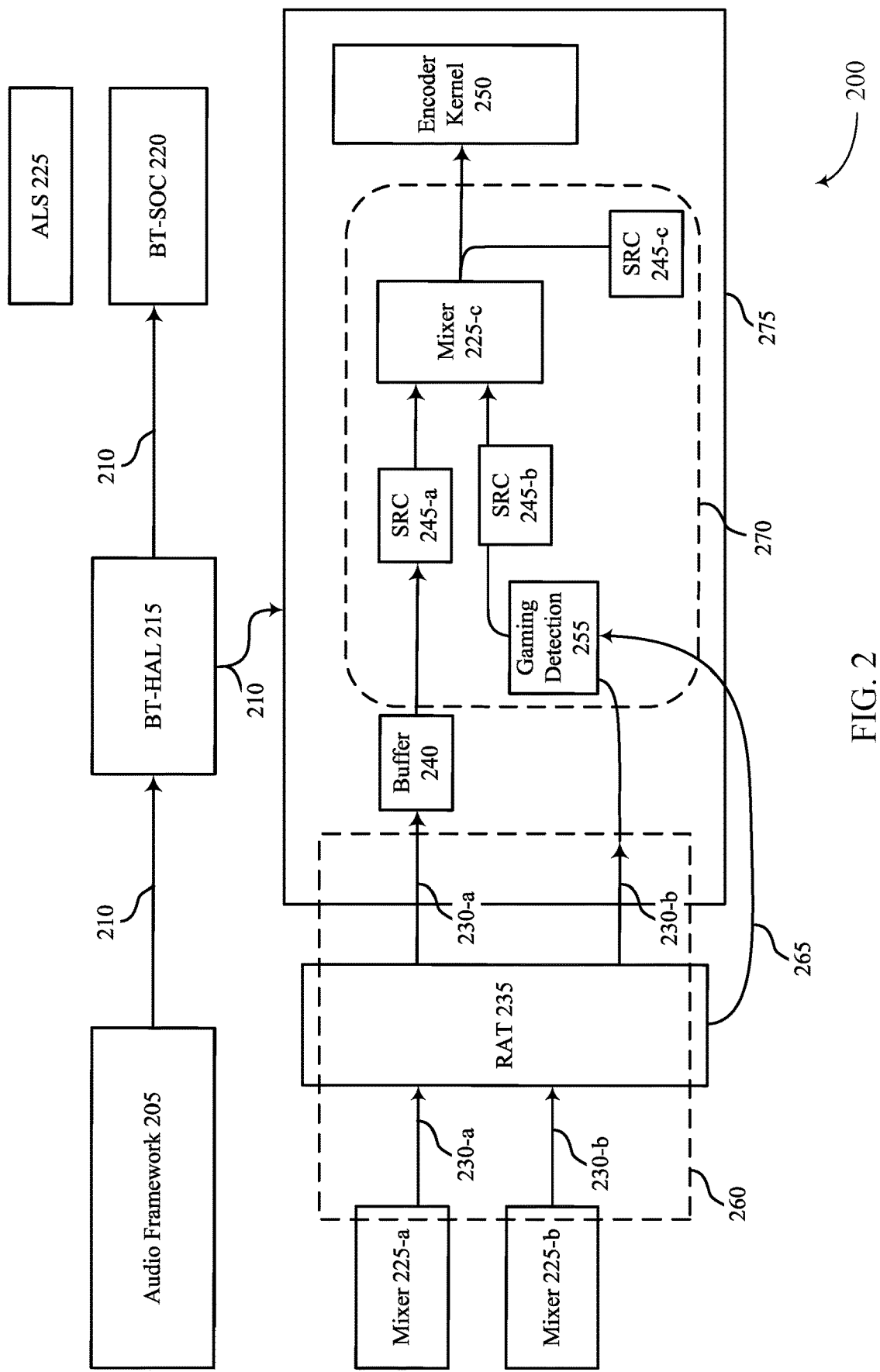
FIG. 2 illustrates an example of an audio buffering block diagram that supports seamless transitions between media modes in accordance with one or more aspects of the present disclosure.

FIG. 2 illustrates an example of an audio buffering block diagram 200 that supports seamless transitions between media modes in accordance with one or more aspects of the present disclosure. The audio buffering block diagram 200 may include aspects of WLAN 100 in FIG. 1, such as an audio source device and an audio sink device. For example, the audio source device and the audio sink device may communicate audio signals using the audio buffering block diagram 200. The audio buffering block diagram 200 may illustrate components of the audio source device. The audio source device may transmit an audio signal to the audio sink device. The audio source device may separately mix an HQ audio stream 230-a using a mixer 225-c and a gaming audio stream 230-b using a mixer 225-b. Mixer 225-b may be associated with a relatively lower latency of the gaming audio stream 230-b. The HQ audio stream 230-a may be associated with a sampling frequency pre-determined for the audio stream, and the gaming audio stream 230-*b* may be associated with a different sampling frequency (e.g., 48 kilohertz (kHz)/24-bits). The audio source device may input the HQ audio stream 230-*a* and the gaming audio stream 230-*b* to a rate adapted timer (e.g., RAT 235), which may support multiple sampling rates for the multiple audio streams 230. The audio source device may further input the HQ audio stream 230-*a* and the gaming audio stream 230-*b* into an encoder 275. The encoder 275 may further mix the audio streams 230 and adjust the respective latencies of the audio streams 230 to increase audio quality. The RAT 235 may output a gaming enable message 265 to a component of the encoder 275 (e.g., gaming detection 255). The gaming enable message 265 may indicate a relatively low latency of the gaming audio stream 230-*b*. Additionally, or alternatively, the audio source device may include an audio framework 205, which may include a library for audio mode detection. In some examples, the audio framework 205 may output an audio mode message 210 to a BT hardware abstract layer (BT-HAL 215). The audio mode message 210 may indicate whether the received audio streams include an HQ audio stream, a gaming audio stream, or both. The BT-HAL 215 may output the audio mode message 210, which may be inputted to the encoder 275 and the BT system on chip (e.g., BT-SOC 220). Additionally, or alternatively, the audio source device may include audio lossless coding (ALS 255), which may be in communication with the remaining components of the audio source device and may allow for lossless audio compression The audio mode message 210 may indicate to switch to the gaming audio stream.

In some examples, the encoder 275 may use the inputs of the HQ audio stream 230-*a*, the gaming audio stream 230-*b*, the gaming enable message 265, and the audio mode message 210 to separately encode the audio streams 230. For example, the encoder 275 may use the buffer 240 to buffer the HQ audio stream 230-*a*. The encoder 275 may refrain from buffering the gaming audio stream 230-*b*, and the encoder 275 may input the buffered HQ audio stream 230-*a* and the gaming audio stream 230-*b* into a mixer component 270 prior to encoding. The mixer component 270 may include multiple sample rate converters (SRC 245), such as SRC 245-*a*, SRC 245-*b*, and SRC 245-*c*. The SRC 245 may support adjusting the sampling rate of the audio streams 230. As such, the mixer component 270 may detect the gaming audio stream 230-*b* using the gaming detection 255 and the gaming enable message 265. Based on detecting the gaming audio stream 230-*b*, the mixer component 270 may adjust the sampling rate of the audio streams 230 using SRC 245-*a* and SRC 245-*b*. For example, the mixer component 270 may lower the sampling rate associated with the HQ audio stream 230-*a* relative to the sampling rate associated with the gaming audio stream 230-*b*. The adjusted audio streams 230 may be output into a mixer 225-*c*. The mixer component 270 may output the audio streams to an encoder kernel 250 (e.g., kernel). The encoder kernel 250 may insert an OLA packet to the audio streams 230. The OLA packet may allow for the audio source device to transition between the HQ audio mode and the gaming audio mode and switching between the sampling rate associated with the HQ audio stream 230-*a* and the sampling rate associated with the gaming audio stream 230-*b*. The kernel 250 may encode the audio streams 230 as audio signals. The kernel 250 may use the SRC 245-*c* to perform an echo cancel procedure. The audio source device may output one or more of the audio signals (e.g., HQ audio signal or gaming audio signal) to the audio sink device.

Figure 3:
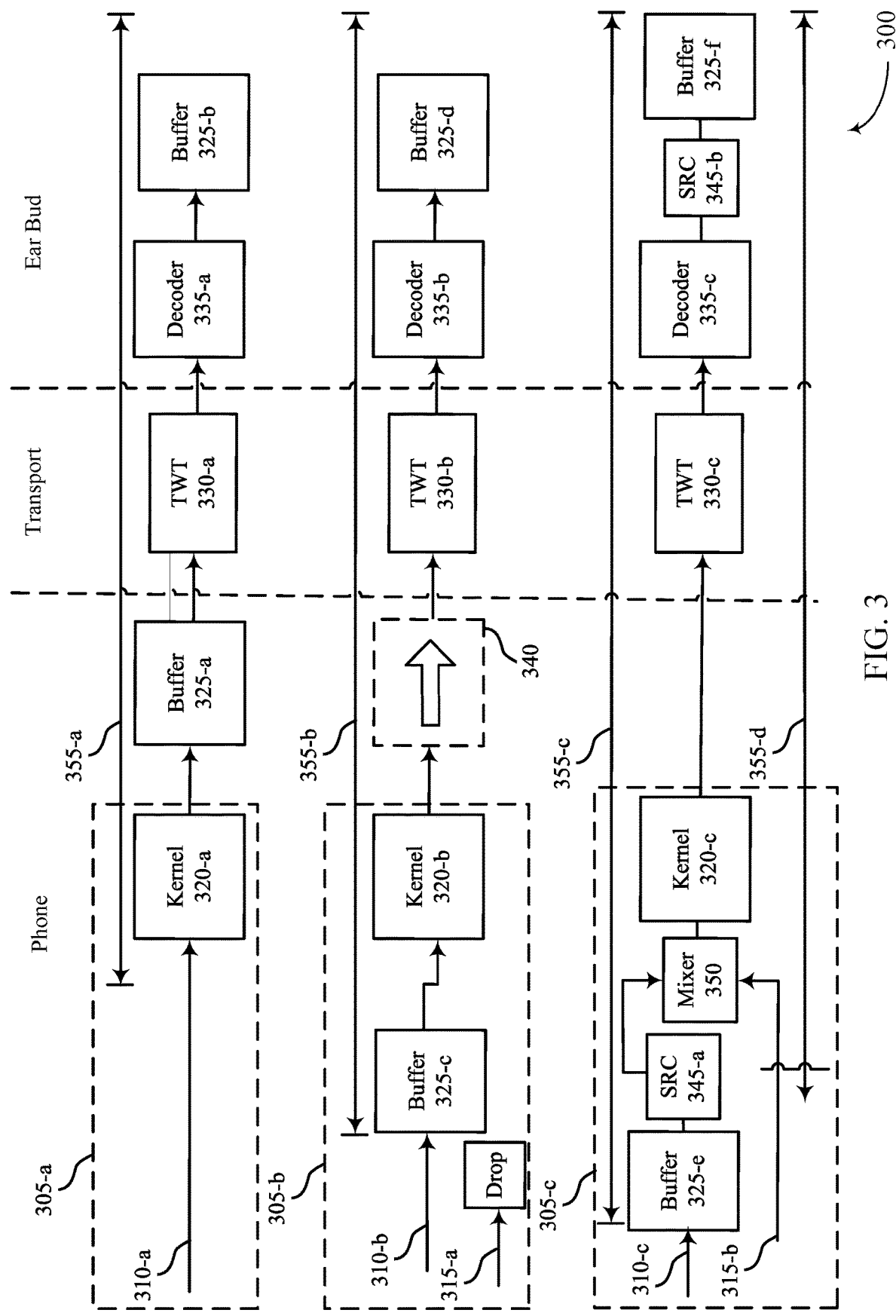
FIG. 3 illustrates an example of an audio stream mixing scheme that supports seamless transitions between media modes in accordance with one or more aspects of the present disclosure.

FIG. 3 illustrates an example of an audio stream mixing scheme 300 that supports seamless transitions between media modes in accordance with one or more aspects of the present disclosure. The audio stream mixing scheme 300 may include aspects of the audio buffering block diagram 200 in FIG. 2. For example, the audio stream mixing scheme 300 may include a buffer 325, an HQ audio stream 310, and a gaming audio stream 315. The buffer 325, the HQ audio stream 310, and the gaming audio stream 315. may be examples of corresponding devices illustrated by and described with reference to FIGS. 1 and 2. In some implementations, an audio source device may use the kernel 320 and the buffer 325 to transition between the HQ audio stream 310 and the gaming audio stream 315 with decreased latency. The audio source device may switch between transition states (e.g., system transition states) to mix the HQ audio stream 310 and the gaming audio stream 315.

In some examples, the audio source device may maintain a latency associated with the gaming audio mode (e.g., 20 milliseconds) while mixing the gaming audio stream 315 with the HQ audio stream 310. In this example, the HQ audio stream 310 may be associated with a relatively higher latency. In order to maintain the latency associated with the gaming mode audio, the audio source device may use an encoder 305-*a* to separately adjust the latency for the two audio streams in transitioning from the HQ audio stream 310 to the gaming audio stream 315. Prior to the transition, the audio source device may input the HQ audio stream 310-*a* into an encoder kernel 320-*a*. The audio source device (e.g., a phone) may transmit the encoded HQ audio stream 310-*a* to an audio sink device (e.g., an ear bud). The audio source device may transmit the HQ audio stream 310-*a* at relatively high latency (e.g., 220 milliseconds) to a buffer 325-*a* prior to the transmission. The transmission time associated with the transport may be associated with an end to end latency 355-*a* (e.g., 220 milliseconds). Additionally, or alternatively, the audio sink device may be associated with a target wake time window (e.g., a TWT window 330-*a*) during the end to end latency time (e.g., 100 milliseconds). The TWT window 330-*a* may be associated with a processing time for the encoder and the decoder based on the transmission of the HQ audio stream 310, the gaming audio stream 315, or both. The audio sink device may receive the HQ audio stream 310-*a* and decode the HQ audio stream 310 using decoder 335-*a*. The decoder 335-*a* may decode the HQ audio stream 310-*a* at a frequency of 192 Hz. The audio sink device may input the decoded HQ audio stream 310-*a* to the buffer 325-*b*, and the audio sink device may further process the HQ audio stream 310-*a*.

During the transition from the HQ audio mode to the gaming audio mode, the encoder 305-*b* may buffer the HQ audio stream 310-*b* (e.g., previously HQ audio stream 310-*a*) and drop a part of the gaming audio stream 315-*a*. For example, the audio source device may input the HQ audio stream 310-*b* into a buffer for a period of time (e.g., 200 ms). The encoder kernel 320-*b* may not receive the HQ audio stream 310-*b* while the audio source device buffers the HQ audio stream 310-*b*. Additionally, or alternatively, the audio source device may drop a first part of the gaming audio stream 315-*a* (e.g., the source may not input the first 200 milliseconds of the gaming audio stream 315-*a*). Rather than buffering the HQ audio stream 310-*b* after encoding, the audio source device may flush (transmit) the HQ audio stream 310-*b* to the audio sink device (e.g., the decoder output playout may empty the output buffer 325-*d*) at 340. The audio source device may disable the TWT window 330-*b*, and the audio source device may flush out the compressed audio (e.g., compressed audio of the HQ audio stream 310-*b*) over the transport to the audio sink device. In some examples, the audio source device may adjust the TWT window 330-*b* (e.g., decrease the TWT window 330-*b* to 4 milliseconds).

After the HQ audio stream 310-*b* is flushed out, the audio source device may mix the HQ audio stream 310-*c* and the gaming audio stream 315-*b*. The audio source device may buffer the HQ audio stream 310-*c* and decrease the sampling rate (e.g., down sample) the HQ audio stream 310-*c* to efficiently mix the audio streams. For example, the audio source device may input the HQ audio stream 310-*c* into the buffer 325-*e* The buffer 325-*c* may buffer the HQ audio stream 310-*c* for a period of time (e.g., 200 milliseconds). The audio source device may input the buffered HQ audio stream 310-*c* into SRC 345-*a*, which may decrease the sampling rate associated with the HQ audio stream (e.g., decrease from the 192 kHz decoder 335-*a* output to 48 kHz). Additionally, or alternatively, the audio source device may mix the adjusted HQ audio stream 310-*c* and the gaming audio stream 315-*b* using the mixer 330. The encoder 305-*c* may enable the TWT window 330-*c* to a period of time (e.g., 4 milliseconds). The audio source device may transmit the mixed audio streams to the audio sink device. The audio source device may decrease the transmission rate due to the increased throughput of the mixed signal (e.g., the latency may be 20 milliseconds). The audio sink device may decode the mixed audio streams at a decreased frequency (e.g., 48 Hz), and the audio sink device may further process the mixed audio stream using the buffer 325-*f* to increase the frequency (e.g., to 192 Hz).

Figure 4:
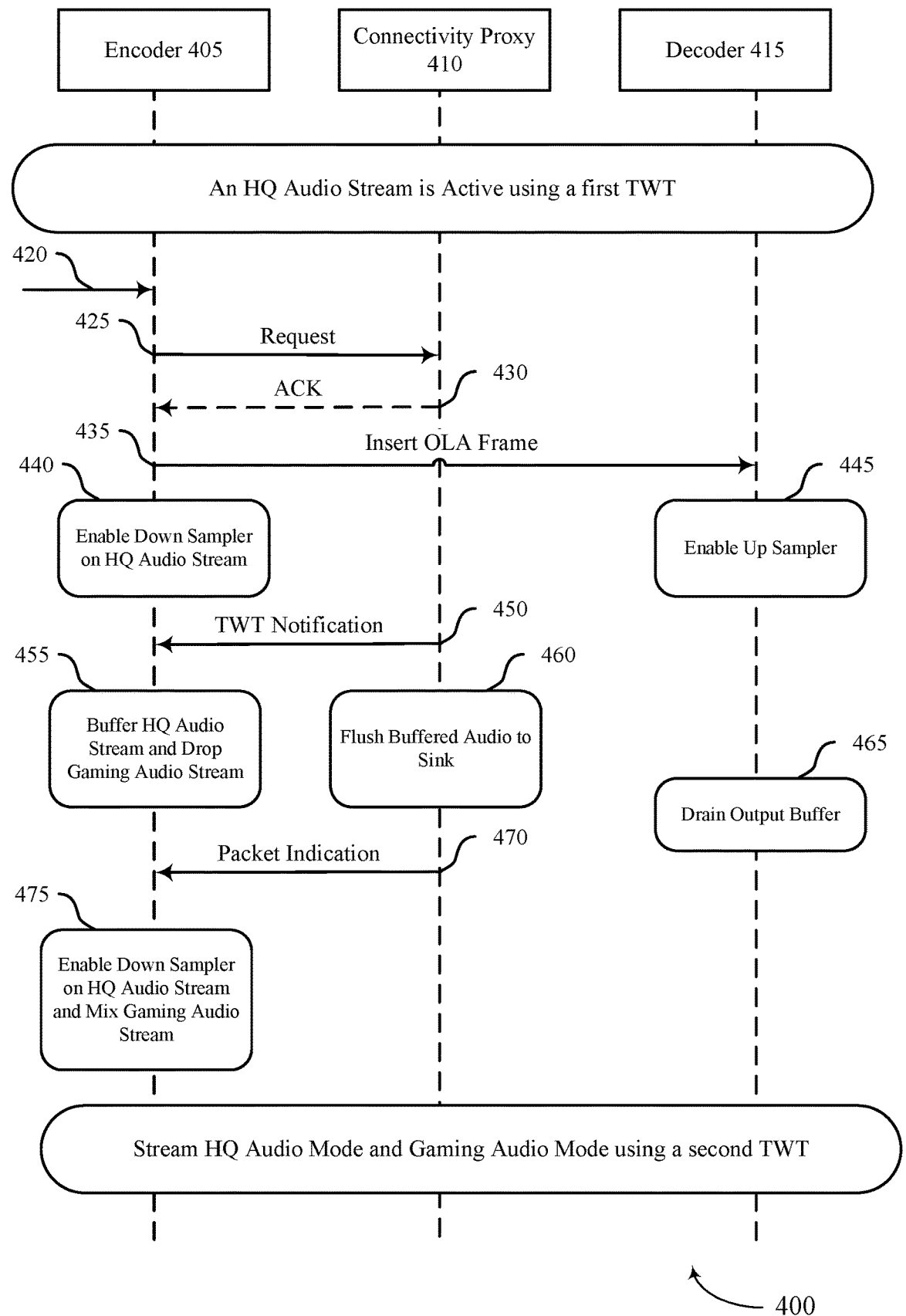
FIG. 4 illustrates an example of an audio stream mixing process flow that supports seamless transitions between media modes in accordance with one or more aspects of the present disclosure.

FIG. 4 illustrates an example of an audio stream mixing process flow 400 that supports seamless transitions between media modes in accordance with one or more aspects of the present disclosure. The audio stream mixing process flow 400 may include aspects of FIGS. 2 and 3. For example, the audio stream mixing process flow 400 may include an encoder 405, a decoder 415, an HQ audio stream, and an gaming audio stream 420. The encoder 405, the decoder 415, the HQ audio stream, and the gaming audio stream 420 may be examples of corresponding devices and audio streams illustrated by and described with reference to FIGS. 2 and 3. In some implementations, an audio source device and an audio sink device may use the encoder 405 and the decoder 415 to transition between the HQ audio stream and the gaming audio stream 420 with decreased latency.

In some examples, an audio source device may use the encoder 405 to transmit an audio signal to the decoder 415 of an audio sink device. The audio source device may transmit an HQ audio stream using a connectivity proxy 410 (e.g., a transport). The audio source device may enable a first TWT window for the audio sink device to receive the HQ audio stream (e.g., 100 milliseconds). The audio source device may receive a gaming audio stream 420, and the audio source device may use the encoder 405 to transmit a request 425 to the audio sink device. For example, the request 425 may indicate to the audio sink device to switch from the HQ audio mode to the gaming audio mode. Additionally, or alternatively, the request 425 may include a request to adjust the TWT window of the audio sink device. The adjustment of the TWT window may be associated with a delay (e.g., more than 200 milliseconds). During the delay, the encoder 405 may generate data based on the HQ audio stream, and the encoder 405 may transition to a high-compression gaming mode while maintaining a target latency (e.g., 220 milliseconds). Based on receiving the request 425, the connectivity proxy 410 may optionally transmit an acknowledgment message (e.g., ACK 430) to the encoder 405.

Additionally, or alternatively, the encoder 405 may transmit an OLA frame 435 to the decoder 415. The OLA frame may indicate for the decoder to increase the decoding rate (e.g., increase from 48 kHz to 192 kHz). At 440, the encoder 305 may enable the down sampler (e.g., decreasing the encoding rate) for the HQ audio stream, and at 445, the decoder 415 may enable the up sampler (e.g., increasing the decoding rate). In some examples, the OLA frame may indicate that the audio source device inserted the OLA frame into a first packet of the gaming audio stream 420 based on the transition from the HQ audio mode to the gaming audio mode. In some examples, the connectivity proxy 410 may transmit a TWT window notification 450 to the encoder 305. The TWT window notification 450 may indicate that the TWT window has been adjusted to a second TWT window associated with a lower period of time (e.g., 4 milliseconds).

At 455, to continue transitioning to the gaming audio mode, the encoder 405 may buffer the HQ audio stream for a period of time and drop a part of the gaming audio stream 420. At 460, the connectivity proxy may flush the buffered HQ audio stream to the audio sink device. At 465, the decoder 415 of the audio sink device may drain the output buffer of the audio sink device (e.g., remove the HQ audio stream). The connectivity proxy 410 may transmit a packet indication 470 to the encoder 405. The packet indication 460 may indicate the generation of a first packet of the gaming audio stream 420 (e.g., a sync message to indicate the encoder 405 to generate a packet).

At 475, the encoder 405 may enable the down sampler for the HQ audio stream, and the encoder 405 may mix the HQ audio stream and the gaming audio stream 420. The audio source device and the audio sink device may stream the HQ audio mode and the gaming audio mode using the second TWT window. Additionally, or alternatively, the encoder 405 may enable the down sampler for the HQ audio stream prior to the buffering the HQ audio stream.

Additionally, or alternatively, the audio source device and the audio sink device may transition out of the gaming audio stream 420, as further described with reference to FIGS. 5 and 6. In this example, the audio source device may stop streaming the gaming audio stream 420 (e.g., the game session may stop). The encoder 405 may increase the transmission rate of the HQ audio stream by transferring the buffer to the audio sink device (e.g., 200 milliseconds of buffering). The latency window with transferring the buffer may be relatively large, and the encoder 405 may adjust the TWT WINDOW (e.g., increase to 100 milliseconds). The encoder 405 may increase the latency adjustment (TTPAdj) (e.g., TTPAdj may ramp up) based on transferring the buffering to the audio sink device. The encoder 405 may transmit messages to the connectivity proxy 410 and the decoder 415 indicating the transition to the HQ audio mode. The encoder 405 may remove the down sampler, and the decoder 415 may remove the up sampler, switch the sampling frequency of the decoder 415, or both. The connectivity proxy may transmit signaling to the encoder 405 to adjust the TWT window, and the encoder 405 may increase the TWT window in response (e.g., increase to 100 milliseconds). The encoder 405 may operate in XPAN-HQ mode, such that the encoder 405 may adjust the packet sizes and periods of the HQ audio stream.

Figure 5:
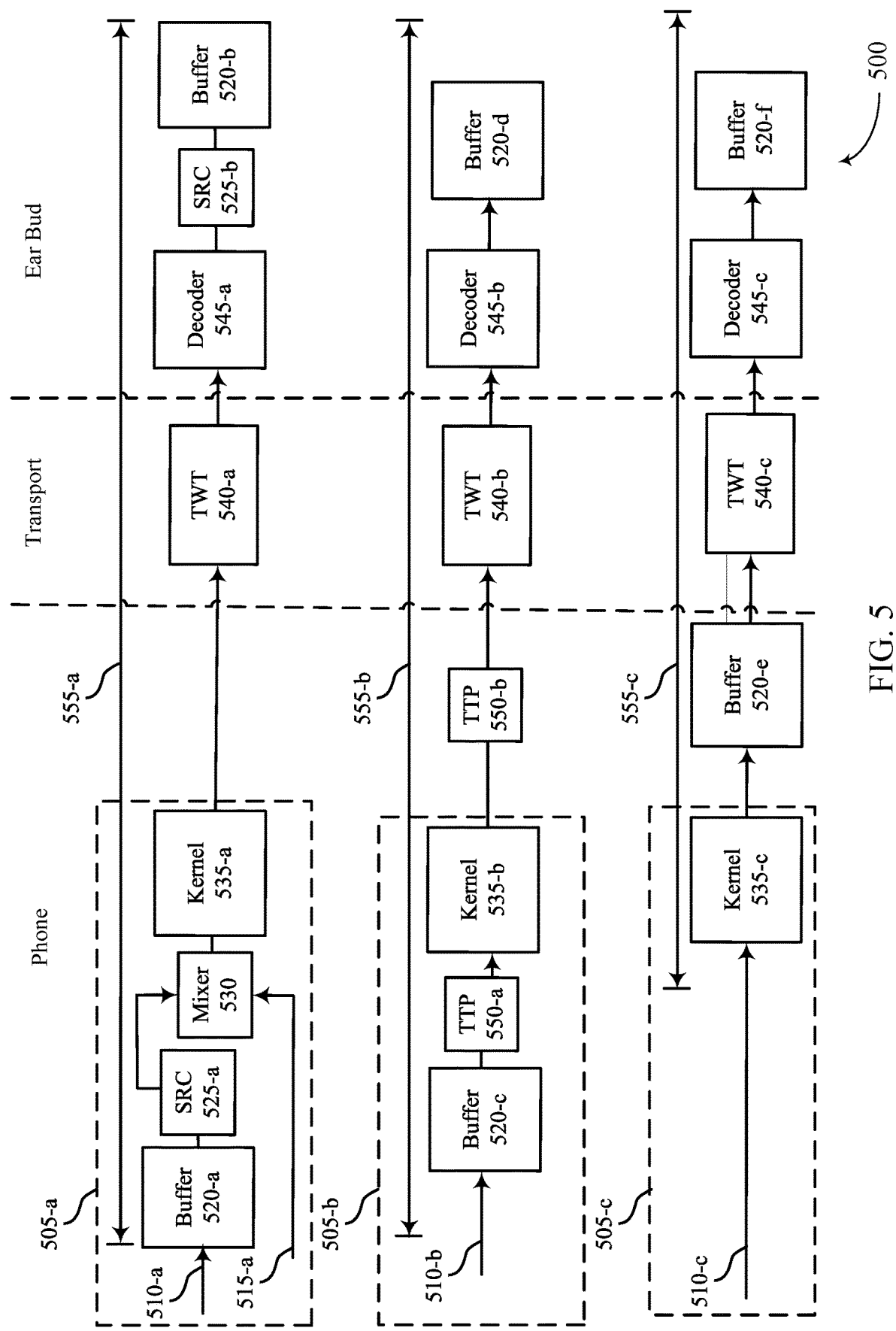
FIG. 5 illustrates an example of an audio stream mixing scheme that supports seamless transitions between media modes in accordance with one or more aspects of the present disclosure.

FIG. 5 illustrates an example of an audio stream mixing scheme 500 that supports seamless transitions between media modes in accordance with one or more aspects of the present disclosure. The audio stream mixing scheme 500 may include aspects of the FIGS. 2-4. For example, the audio stream mixing scheme 500 may include a buffer 520, a kernel 535, an HQ audio stream 510, and a gaming audio stream 515. The buffer 520, the kernel 535, an HQ audio stream 510, and a gaming audio stream 515 may be examples of corresponding devices illustrated by and described with reference to FIGS. 2-4. In some implementations, an audio source device may use the kernel 535 and the buffer 520 to transition out of the mixed audio mode and back to the HQ audio stream 510 with decreased latency. The audio source device may switch between transition states to return to streaming the HQ audio stream 510.

In some examples, the audio source device may maintain a latency associated with the gaming audio mode (e.g., 20 milliseconds) while mixing the gaming audio stream 515 with the HQ audio stream 510. In this example, the HQ audio stream 510 may be associated with a relatively higher latency. The audio source device may switch from the mixed audio mode back to primarily streaming the HQ audio stream 510. As discussed in FIG. 3, after the HQ audio stream 510 is flushed out using the audio sink device, the audio source device may mix the HQ audio stream 510-*a* and the gaming audio stream 515-*a* The audio source device may buffer and decrease the sampling rate the HQ audio stream 510-*a* to mix the audio streams. For example, the audio source device may input the HQ audio stream 510-*a* into the buffer 520-*a*. The buffer 520-*a* may buffer the HQ audio stream 510-*a* for a period of time (e.g., 200 milliseconds). The audio source device may input the buffered HQ audio stream 510-*a* into SRC 525-*a*, which may decrease the sampling rate associated with the HQ audio stream (e.g., decrease from the 192 kHz decoder output to 48 kHz). Additionally, or alternatively, the audio source device may mix the adjusted HQ audio stream 510-*a* and the gaming audio stream 515-*a* using the mixer 530. The encoder 505-*a* may set the TWT window 540-*a* to a period of time (e.g., 4 milliseconds). The audio source device may transmit the mixed audio streams to the audio sink device. The audio source device may decrease the latency due to the increased throughput of the mixed signal (e.g., the transmission rate may be 20 milliseconds). The audio sink device may decode the mixed audio streams at a decreased frequency (e.g., 48 Hz), and the audio sink device may further process the mixed audio stream using the SRC 525-*b* and the buffer 520-*b* to increase the frequency (e.g., to 192 Hz).

During the transition from the HQ audio mode to the gaming audio mode, the encoder 305-*b* may transfer the buffer back to the audio sink device by pushing the encoded mixed audio streams over the transport (e.g., transport link) at an increased transmission rate (e.g., a transmission rate faster than real time). For example, the audio source device may transfer the buffer 520-*c* using transmission rate adjustments (the TTP 550-*a* and the TTP 550-*b*). The audio source device may input the HQ audio stream 510-*b* (e.g., previously HQ audio stream 510-*a*) and refrain from streaming the gaming audio stream. The encoder kernel 535-*b* may not receive the HQ audio stream 510-*b* while the audio source device buffers the HQ audio stream 510-*b*. The kernel 535-*b* may encode the HQ audio stream 510-*b* and the remaining audio stream, and the encoder 505-*b* may transmit the audio at an increased transmission rate at TTP 550-*b*.

After transferring the buffer to the audio sink device, the audio source device may reenable the TWT window 540-*c* at an increased period of time (e.g., 100 milliseconds). The audio source device may sync the encoder 505-*c* to the reenabled TWT window by flagging a last part of the mixed audio stream that may be included in the TWT window. The audio source device may sync the encoder by transmitting a TWT window sync message to adjust the TWT window 540-*c* to 4 milliseconds. The audio source device may input the HQ audio stream 510-*c* into the encoder kernel 535-*c* based on transitioning out of the mixed audio mode. The audio source device may transmit the encoded HQ audio stream 510-*c* to the audio sink device. The audio sink device may use the decoder 545-*c* and the buffer 520-*f* to further process the HQ audio stream 510-*c*.

Figure 6:
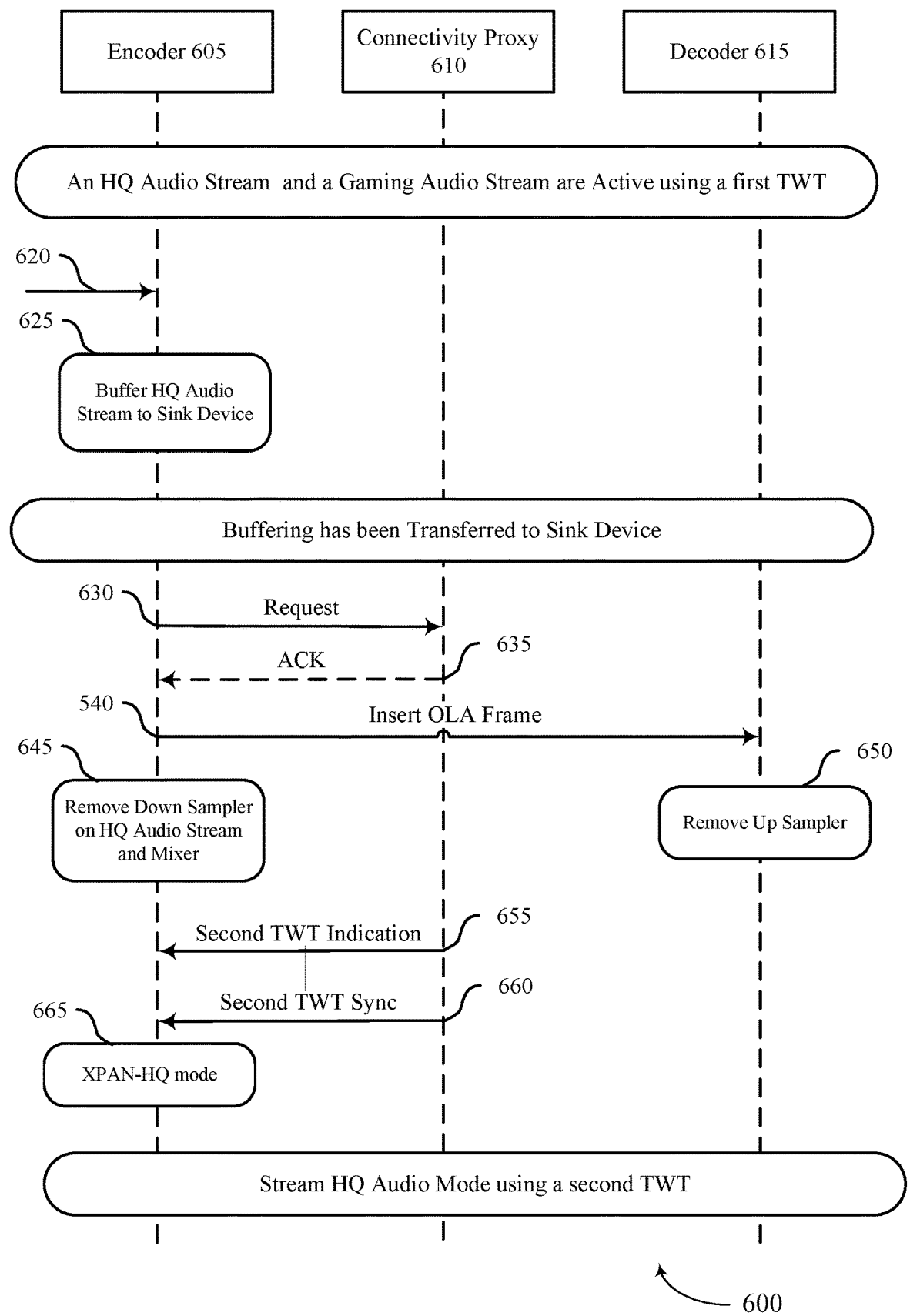
FIG. 6 illustrates an example of an audio stream mixing process flow that supports seamless transitions between media modes in accordance with one or more aspects of the present disclosure.

FIG. 6 illustrates an example of an audio stream mixing process flow 600 that supports seamless transitions between media modes in accordance with one or more aspects of the present disclosure. The audio stream mixing process flow 600 may include aspects of FIGS. 2-4. For example, the audio stream mixing process flow 600 may include an encoder 605, a decoder 615, an HQ audio stream, and a gaming audio stream. The encoder 605, a decoder 615, an HQ audio stream, and an gaming audio stream may be examples of corresponding devices and audio streams illustrated by and described with reference to FIGS. 2-4. In some implementations, an audio source device and an audio sink device may use the encoder 605 and the decoder 625 to transition out of the mixed audio mode with decreased latency.

In some examples, the audio source device and the audio sink device may transition out of streaming both the HQ audio stream and the gaming audio stream by transferring the buffer to the audio sink device. For example, the encoder 605, the connectivity proxy 610, the decoder 615 may be streaming the HQ audio stream and the gaming audio stream using a first TWT window (e.g., 4 milliseconds). At 620, the user at the audio source device may stop streaming the gaming audio (e.g., the gaming session may stop), and the encoder 605 and the decoder 615 may transition out of the mixed audio mode.

At 625, the encoder 605 may increase the transmission rate of the HQ audio stream by transferring the buffer to the audio sink device (e.g., 200 milliseconds of buffering), resulting in a latency at the audio sink device to allow adjustment of the TWT window to a second TWT window (e.g., increase the TWT window to 100 milliseconds). The encoder 605 may increase the latency adjustment (TTPAdj) (e.g., TTPAdj may ramp up) to transfer the buffering to the audio sink device. At 630, the audio source device may use the encoder 605 to transmit a request 630 to the audio sink device. For example, the request 630 may indicate to the audio sink device to switch from the gaming audio mode to the HQ audio mode. Additionally, or alternatively, the request 630 may include a request to adjust the TWT window of the audio sink device. The adjustment of the TWT window may be associated with a delay (e.g., more than 200 milliseconds). Based on receiving the request 630, the connectivity proxy 610 may transmit an acknowledgment message (e.g., ACK 635) to the encoder 605.

Additionally, or alternatively, at 640, the encoder 605 may transmit an OLA frame to the decoder 615. The OLA frame may indicate for the decoder 615 to increase the decoding rate (e.g., increase from 48 kHz to 192 kHz). At 645, the encoder 605 may disable the down sampler (e.g., decreasing the encoding rate) for the HQ audio stream. Accordingly, at 650, the decoder 615 may disable the up sampler (e.g., decrease from 192 kHz to 48 kHz), switch the sampling frequency of the decoder 615, or both. The connectivity proxy 610 may transmit a second TWT indication 655 and a second TWT sync message 660 to the encoder 605. The second TWT indication 655 and the second TWT sync message 660 may indicate for the encoder 605 to transition to a second TWT window (e.g., 100 milliseconds). Additionally, the second TWT sync message 660 may indicate the time period at which the encoder 605 may transition to the second TWT window. In some examples, the second TWT sync message 660 may indicate for the encoder to adjust the second TWT window to 4 milliseconds. Based on the adjusted TWT window, the encoder 605 may operate in XPAN-HQ mode 665, such that the encoder 605 may adjust the packet sizes and periods of the HQ audio stream. The encoder 605, the connectivity proxy 610, and the decoder 615 may stream the HQ audio stream at the second TWT window.

Figure 7:
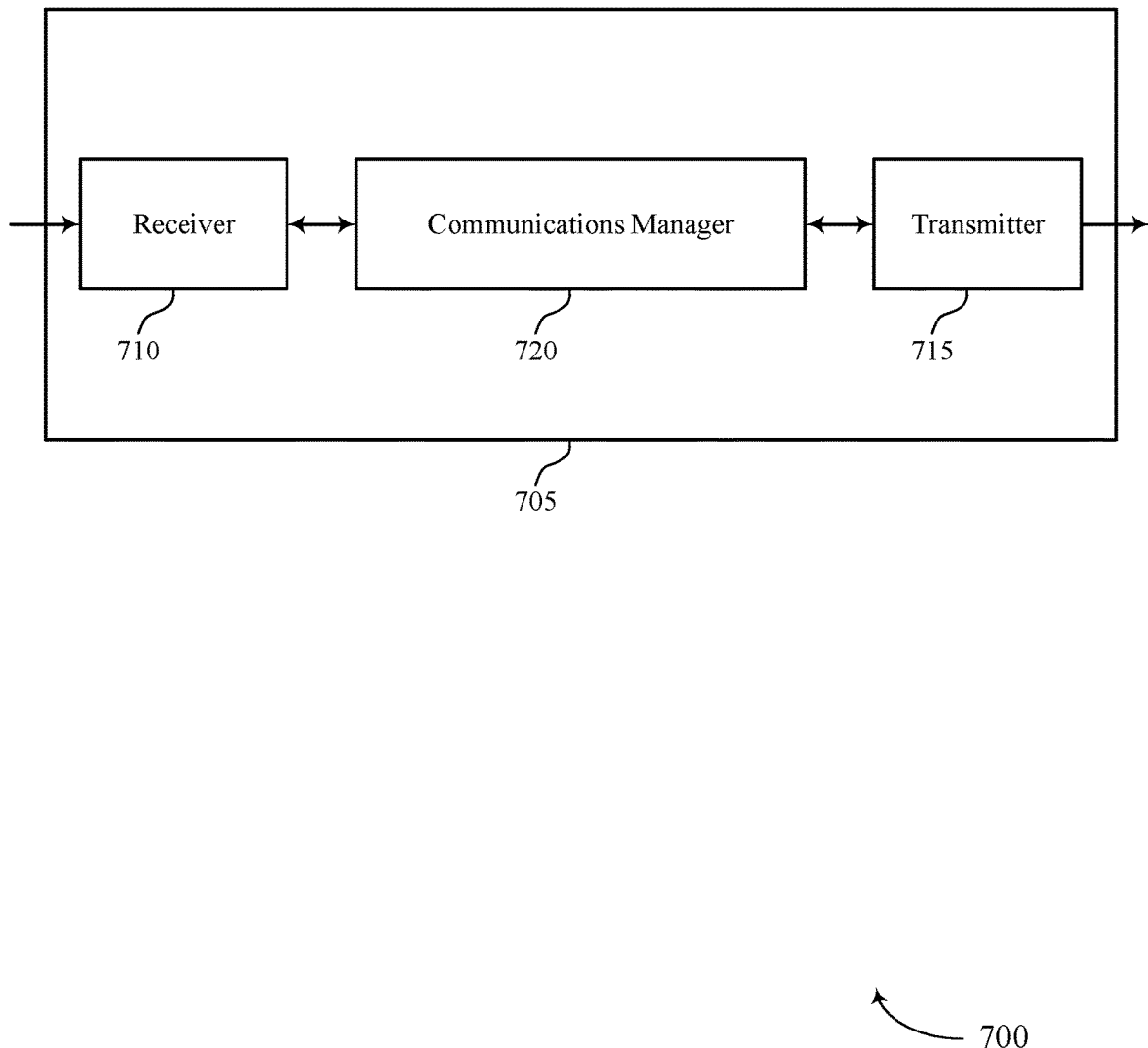
FIGS. 7 and 8 show block diagrams of devices that support seamless transitions between media modes in accordance with one or more aspects of the present disclosure.

FIG. 7 shows a block diagram 800 of a device 805 that supports seamless transitions between media modes in accordance with one or more aspects of the present disclosure. The device 805 may be an example of aspects of a wireless device as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to seamless transitions between media modes). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to seamless transitions between media modes). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of seamless transitions between media modes as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a first wireless device in accordance with examples as disclosed herein. For example, the communications manager 820 may be configured as or otherwise support a means for generating a first media stream associated with a first media mode and a second media stream associated with a second media mode. The communications manager 820 may be configured as or otherwise support a means for buffing the first media stream in accordance with a first latency time value for adjusting a first latency time of the first media stream and buffering the second media stream, independently from the first media stream, in accordance with a second latency time value for adjusting a second latency time of the second media stream. The communications manager 820 may be configured as or otherwise support a means for transmitting a mixed media stream including the buffered first media stream mixed with the buffered second media stream to a second wireless device.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for reduced processing. For example, by treating the HQ audio stream and the gaming audio stream as independent media streams, the device 705 may buffer the audio streams separately and adjust the audio streams separately, which may result in reduced latency and reduced processing.

Figure 8:
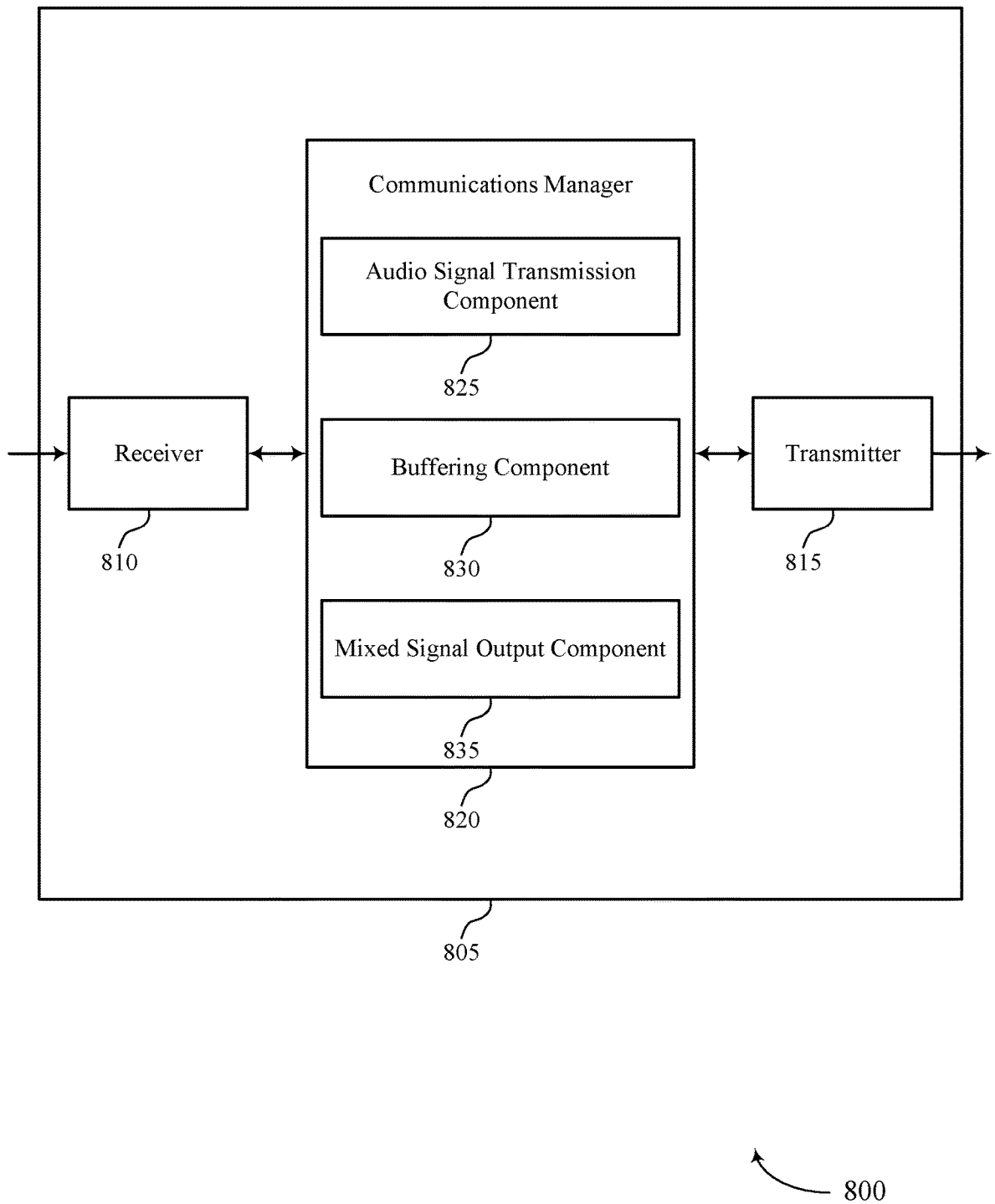

FIG. 8 shows a block diagram 900 of a device 905 that supports seamless transitions between media modes in accordance with one or more aspects of the present disclosure. The device 905 may be an example of aspects of a device 805 or a STA 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to seamless transitions between media modes). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to seamless transitions between media modes). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of seamless transitions between media modes as described herein. For example, the communications manager 920 may include an audio signal transmission component 925, a buffering component 930, a mixed signal output component 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a first wireless device in accordance with examples as disclosed herein. The audio signal transmission component 925 may be configured as or otherwise support a means for generating a first media stream associated with a first media mode and a second media stream associated with a second media mode. The buffering component 930 may be configured as or otherwise support a means for buffering the first media stream in accordance with a first latency time value for adjusting a first latency time of the first media stream and buffering the second media stream, independently from the first media stream, in accordance with a second latency time value for adjusting a second latency time of the second media stream. The mixed signal output component 935 may be configured as or otherwise support a means for transmitting a mixed media stream including the buffered first media stream mixed with the buffered second media stream to a second wireless device.

Figure 9:
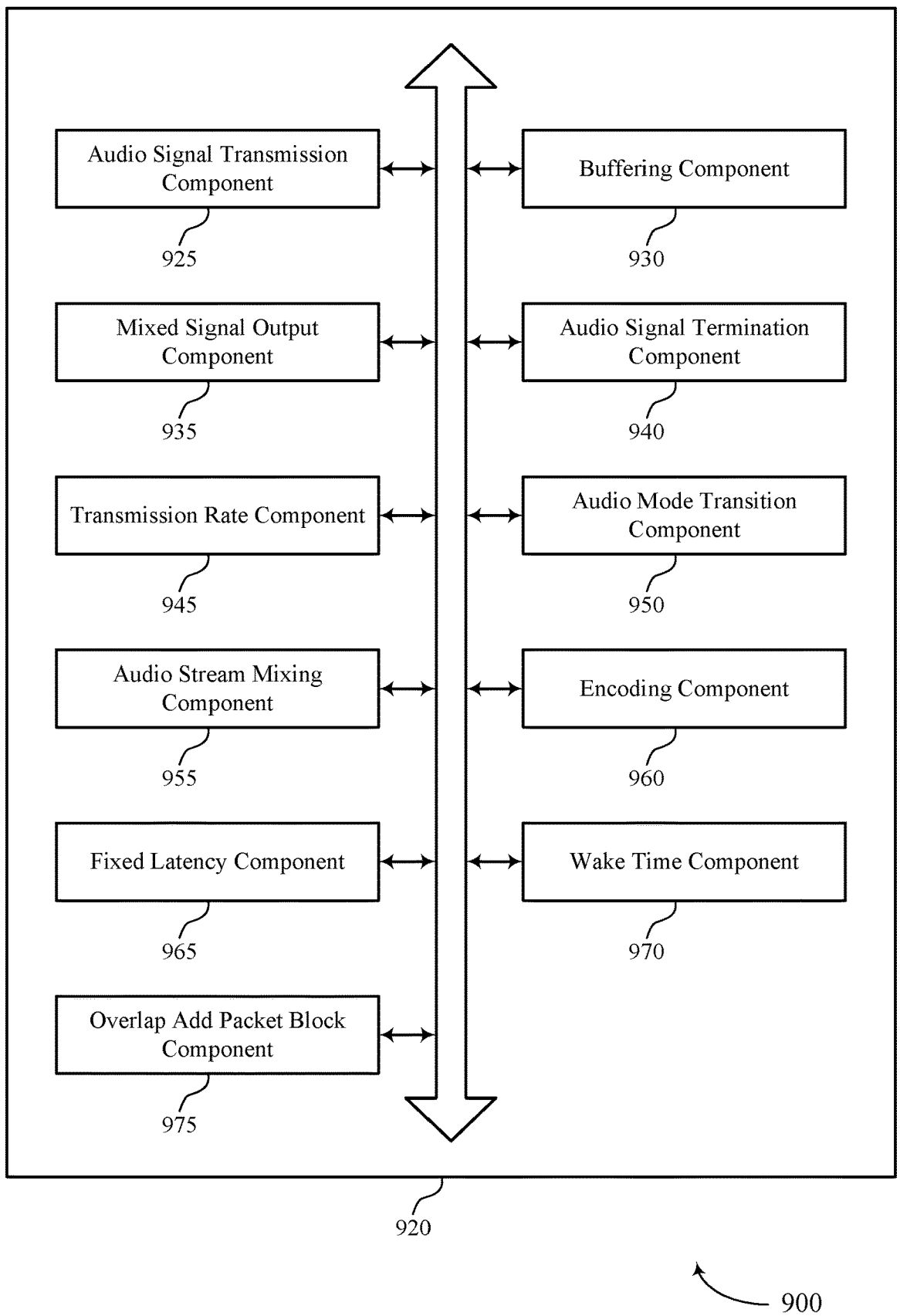
FIG. 9 shows a block diagram of a communications manager that supports seamless transitions between media modes in accordance with one or more aspects of the present disclosure.

FIG. 9 shows a block diagram 1000 of a communications manager 1020 that supports seamless transitions between media modes in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of seamless transitions between media modes as described herein. For example, the communications manager 1020 may include an audio signal transmission component 1025, a buffering component 1030, a mixed signal output component 1035, an audio signal termination component 1040, a transmission rate component 1045, an audio mode transition component 1050, an audio stream mixing component 1055, an encoding component 1060, a fixed latency component 1065, a wake time component 1070, an overlap add packet block component 1075, or any combination thereof. Each of these components may communicate, directly or indirectly, with one another (e.g., via one or more buses).

The communications manager 1020 may support wireless communication at a first wireless device in accordance with examples as disclosed herein. The audio signal transmission component 1025 may be configured as or otherwise support a means for generating a first media stream associated with a first media mode and a second media stream associated with a second media mode. The buffering component 1030 may be configured as or otherwise support a means for buffering the first media stream in accordance with a first latency time value for adjusting a first latency time of the first media stream and buffering the second media stream, independently from the first media stream, in accordance with a second latency time value for adjusting a second latency time of the second media stream. The mixed signal output component 1035 may be configured as or otherwise support a means for transmitting a mixed media stream including the buffered first media stream mixed with the buffered second media stream to a second wireless device.

In some examples, the audio signal termination component 1040 may be configured as or otherwise support a means for terminating the second media stream associated with the second media mode. In some examples, the transmission rate component 1045 may be configured as or otherwise support a means for increasing, in response to terminating the second media stream, a latency of the first independent media stream.

In some examples, the audio signal termination component 1040 may be configured as or otherwise support a means for terminating the first media stream associated with the first media mode. In some examples, the audio mode transition component 1050 may be configured as or otherwise support a means for transitioning from operating in a dual-media mode in which the first media stream and the second media stream are classified as independent from each other to operating in a single media mode based on terminating the first media stream.

In some examples, the audio stream mixing component 1055 may be configured as or otherwise support a means for mixing, after the buffering, the first media stream at a first sample rate and the second media stream at a second sample rate. In some examples, the encoding component 1060 may be configured as or otherwise support a means for jointly encoding the mixed first media stream and the second media stream.

In some examples, the fixed latency component 1065 may be configured as or otherwise support a means for setting the first latency time value associated with the first media stream based on the first sample rate. In some examples, the buffering component 1030 may be configured as or otherwise support a means for resizing and shifting the second media stream between a transmission state at the first wireless device and an encoder input at the first wireless device.

In some examples, the overlap add packet block component 1075 may be configured as or otherwise support a means for inserting an overlap add packet block into the first media stream and the second media stream prior to the mixing, where the overlap add packet block is associated with transitioning from operating in a dual-media mode in which the first media stream and the second media stream are classified as independent from each other to operating in a single media mode.

In some examples, mixing the first media stream and the second media stream includes mixing the first media stream and the second media stream at a third sample rate prior to the mixing.

In some examples, the buffering component 1030 may be configured as or otherwise support a means for refraining from jointly encoding the first media stream and the second media stream for a duration of the second latency time value.

In some examples, the wake time component 1070 may be configured as or otherwise support a means for disabling a first target wake time associated with the first media stream prior to mixing the first media stream at a first sample rate and the second media stream at a second sample rate. In some examples, the wake time component 1070 may be configured as or otherwise support a means for enabling a second target wake time associated with the first media stream. In some examples, the audio stream mixing component 1055 may be configured as or otherwise support a means for mixing the first media stream and the second media stream based on the second target wake time.

In some examples, the wake time component 1070 may be configured as or otherwise support a means for enabling the second target wake time associated with the first media stream. In some examples, the encoding component 1060 may be configured as or otherwise support a means for encoding the first media stream based on the second target wake time.

In some examples, the first media mode includes a high quality mode and the second media mode includes a low-latency mode.

In some examples, the first wireless device includes a media source device and the second wireless device includes a media sink device.

Figure 10:
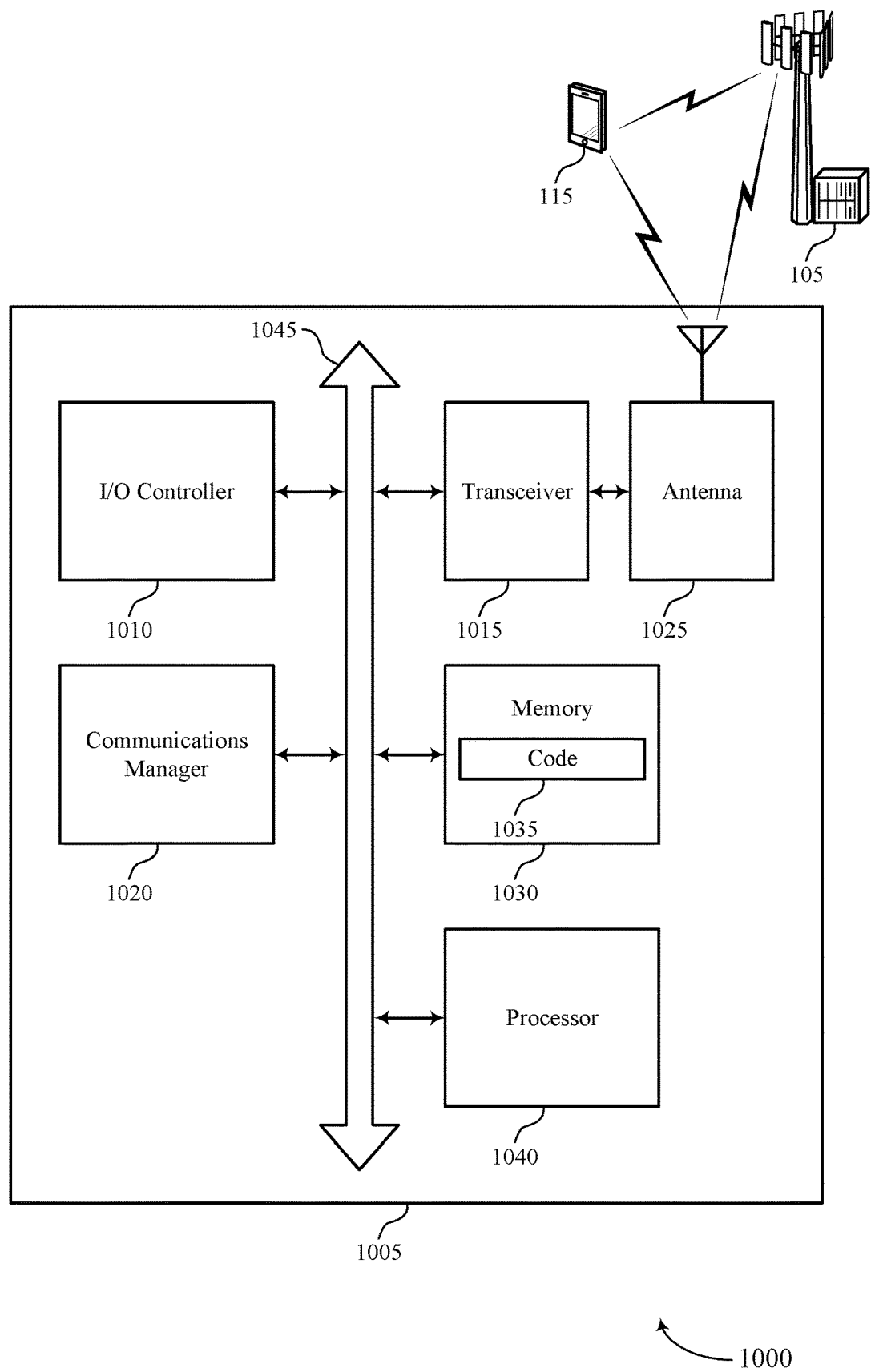
FIG. 10 shows a diagram of a system including a device that supports seamless transitions between media modes in accordance with one or more aspects of the present disclosure.

FIG. 10 shows a diagram of a system 1100 including a device 1105 that supports seamless transitions between media modes in accordance with one or more aspects of the present disclosure. The device 1105 may be an example of or include the components of a device 805, a device 905, or a wireless device as described herein. The device 1105 may include components for bi-directional voice and data communications including components for transmitting and receiving communications, such as a communications manager 1120, an I/O controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting seamless transitions between media modes). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communication at a first wireless device in accordance with examples as disclosed herein. For example, the communications manager 1120 may be configured as or otherwise support a means for generating a first media stream associated with a first media mode and a second media stream associated with a second media mode. The communications manager 1120 may be configured as or otherwise support a means for buffing the first media stream in accordance with a first latency time value for adjusting a first latency time of the first media stream and buffering the second media stream, independently from the first media stream, in accordance with a second latency time value for adjusting a second latency time of the second media stream. The communications manager 1120 may be configured as or otherwise support a means for transmitting a mixed media stream including the buffered first media stream mixed with the buffered second media stream to a second wireless device.

By including or configuring the communications manager 1020 in accordance with examples as described herein, the device 1005 may support techniques for reduced latency, improved user experience related to reduced processing, and reduced power consumption. For example, by treating the HQ audio stream and the gaming audio stream as independent audio streams, the device 1005 may buffer the audio streams separately and adjust the audio streams separately, which may result in reduced latency and reduced power consumption.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of seamless transitions between media modes as described herein, or the processor 1140 and the memory 1130 may be otherwise configured to perform or support such operations.

Figure 11:
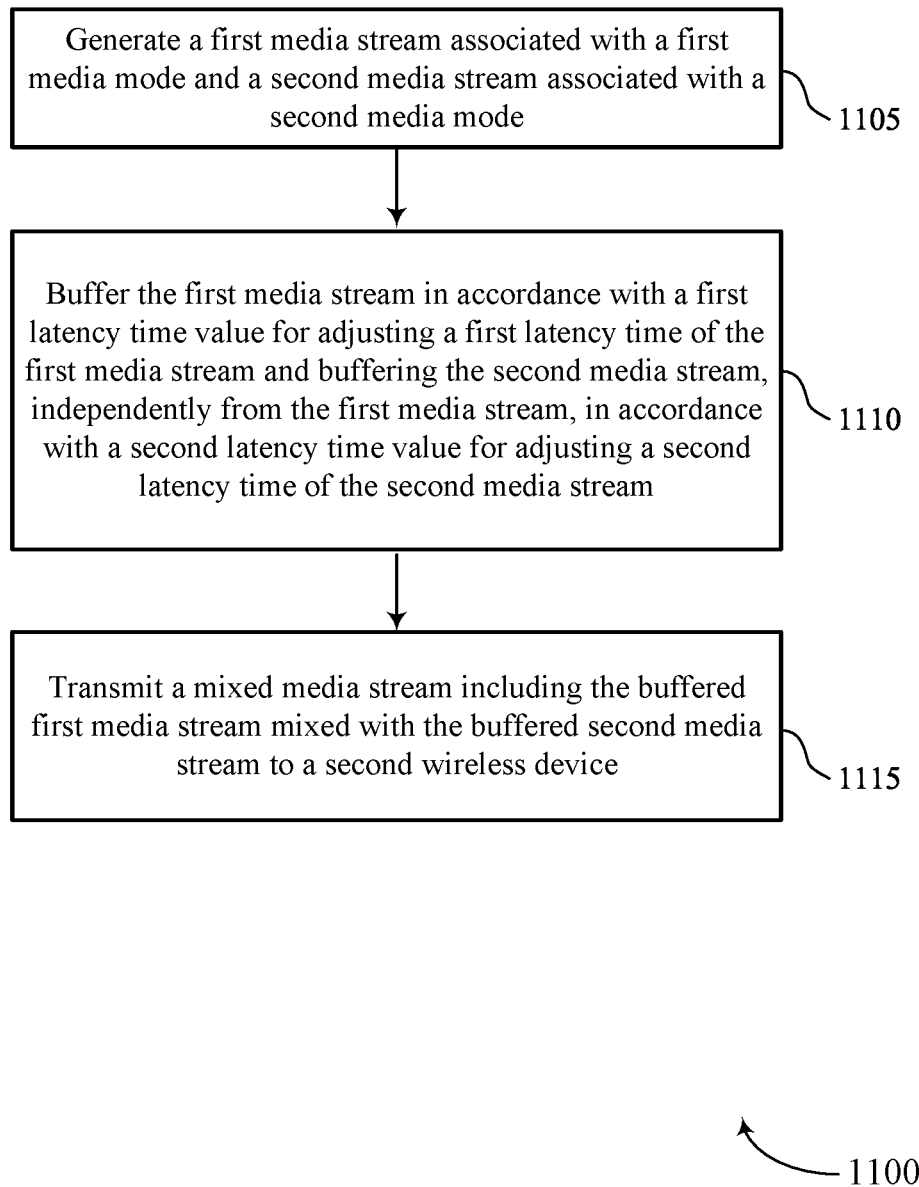
FIGS. 11 through 14 show flowcharts illustrating methods that support seamless transitions between media modes in accordance with one or more aspects of the present disclosure.

FIG. 11 shows a flowchart illustrating a method 1200 that supports seamless transitions between media modes in accordance with one or more aspects of the present disclosure. The operations of the method 1200 may be implemented by a wireless device or its components as described herein. For example, the operations of the method 1200 may be performed by a wireless device as described with reference to FIGS. 1 through 11. In some examples, a wireless device may execute a set of instructions to control the functional elements of the wireless device to perform the described functions. Additionally, or alternatively, the wireless device may perform aspects of the described functions using special-purpose hardware.

At 1205, the method may include generating a first media stream associated with a first media mode and a second media stream associated with a second media mode. The operations of 1205 may be performed in accordance with examples as disclosed herein. In some examples, aspects of the operations of 1205 may be performed by an audio signal transmission component 1025 as described with reference to FIG. 10.

At 1210, the method may include buffering the first media stream in accordance with a first latency time value for adjusting a first latency time of the first media stream and buffering the second media stream, independently from the first media stream, in accordance with a second latency time value for adjusting a second latency time of the second media stream. The operations of 1210 may be performed in accordance with examples as disclosed herein. In some examples, aspects of the operations of 1210 may be performed by a buffering component 1030 as described with reference to FIG. 10.

At 1215, the method may include transmitting a mixed media stream including the buffered first media stream mixed with the buffered second media stream to a second wireless device. The operations of 1215 may be performed in accordance with examples as disclosed herein. In some examples, aspects of the operations of 1215 may be performed by a mixed signal output component 1035 as described with reference to FIG. 10.

Figure 12:
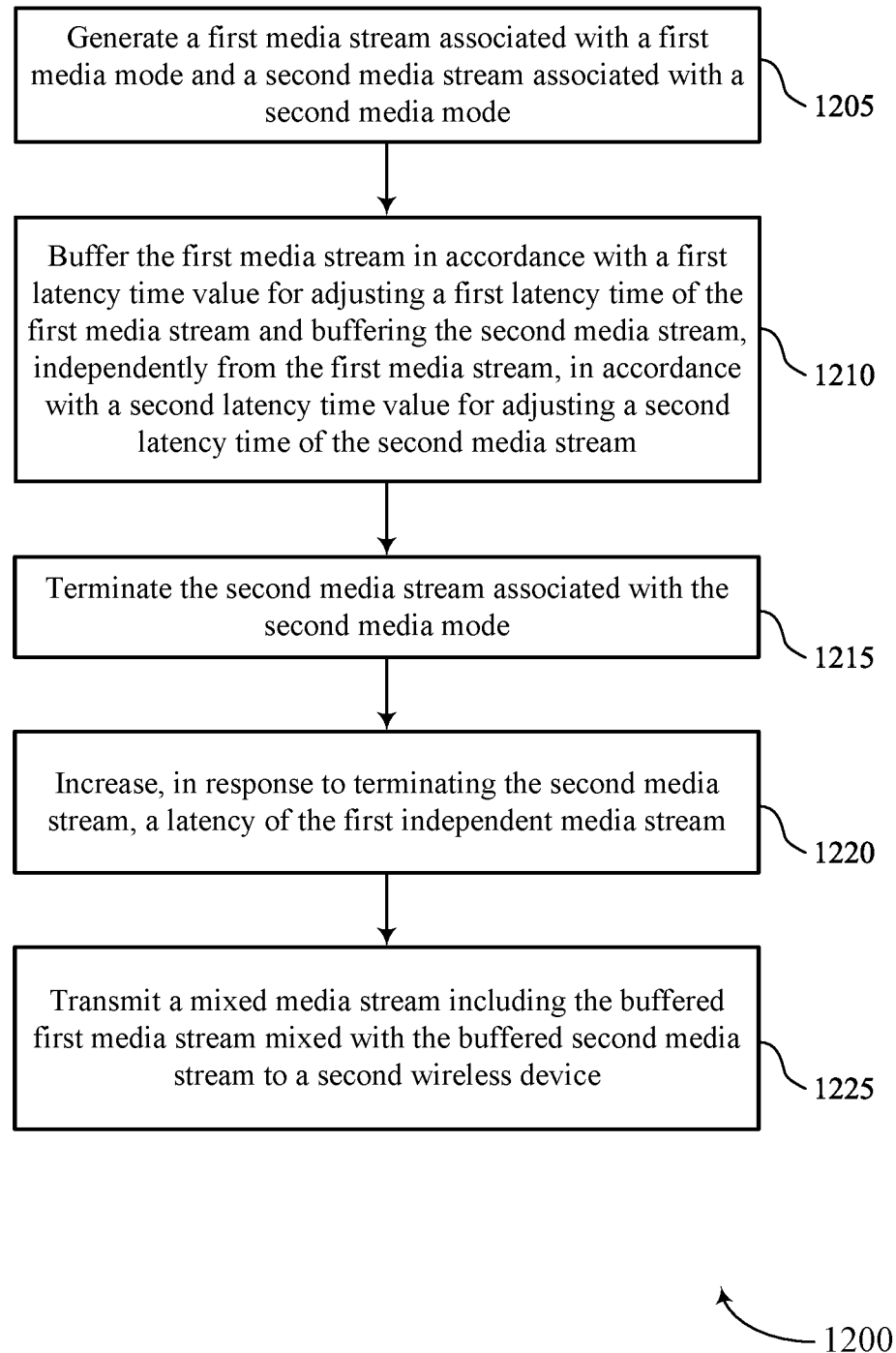

FIG. 12 shows a flowchart illustrating a method 1300 that supports seamless transitions between media modes in accordance with one or more aspects of the present disclosure. The operations of the method 1300 may be implemented by a wireless device or its components as described herein. For example, the operations of the method 1300 may be performed by a wireless device as described with reference to FIGS. 1 through 11. In some examples, a wireless device may execute a set of instructions to control the functional elements of the wireless device to perform the described functions. Additionally, or alternatively, the wireless device may perform aspects of the described functions using special-purpose hardware.

At 1305, the method may include generating a first media stream associated with a first media mode and a second media stream associated with a second media mode. The operations of 1305 may be performed in accordance with examples as disclosed herein. In some examples, aspects of the operations of 1305 may be performed by an audio signal transmission component 1025 as described with reference to FIG. 10.

At 1310, the method may include buffering the first media stream in accordance with a first latency time value for adjusting a first latency time of the first media stream and buffering the second media stream, independently from the first media stream, in accordance with a second latency time value for adjusting a second latency time of the second media stream. The operations of 1310 may be performed in accordance with examples as disclosed herein. In some examples, aspects of the operations of 1310 may be performed by a buffering component 1030 as described with reference to FIG. 10.

At 1315, the method may include terminating the second media stream associated with the second media mode. The operations of 1315 may be performed in accordance with examples as disclosed herein. In some examples, aspects of the operations of 1315 may be performed by an audio signal termination component 1040 as described with reference to FIG. 10.

At 1320, the method may include increasing, in response to terminating the second media stream, a latency of the first independent media stream. The operations of 1320 may be performed in accordance with examples as disclosed herein. In some examples, aspects of the operations of 1320 may be performed by a transmission rate component 1045 as described with reference to FIG. 10.

At 1325, the method may include transmitting a mixed media stream including the buffered first media stream mixed with the buffered second media stream to a second wireless device. The operations of 1325 may be performed in accordance with examples as disclosed herein. In some examples, aspects of the operations of 1325 may be performed by a mixed signal output component 1035 as described with reference to FIG. 10.

Figure 13:
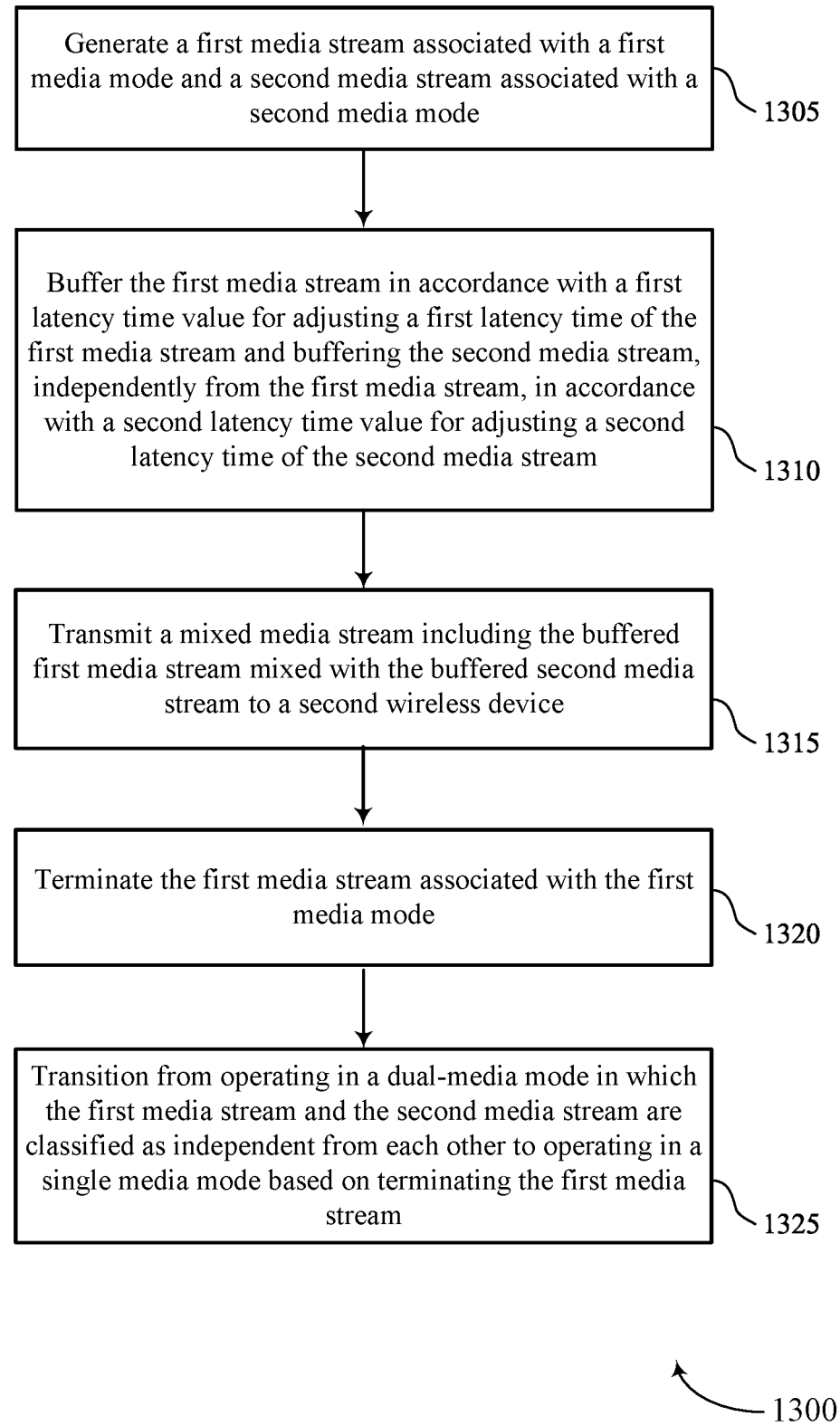

FIG. 13 shows a flowchart illustrating a method 1400 that supports seamless transitions between media modes in accordance with one or more aspects of the present disclosure. The operations of the method 1400 may be implemented by a wireless device or its components as described herein. For example, the operations of the method 1400 may be performed by a wireless device as described with reference to FIGS. 1 through 11. In some examples, a wireless device may execute a set of instructions to control the functional elements of the wireless device to perform the described functions. Additionally, or alternatively, the wireless device may perform aspects of the described functions using special-purpose hardware.

At 1405, the method may include generating a first media stream associated with a first media mode and a second media stream associated with a second media mode. The operations of 1405 may be performed in accordance with examples as disclosed herein. In some examples, aspects of the operations of 1405 may be performed by an audio signal transmission component 1025 as described with reference to FIG. 10.

At 1410, the method may include buffering the first media stream in accordance with a first latency time value for adjusting a first latency time of the first media stream and buffering the second media stream, independently from the first media stream, in accordance with a second latency time value for adjusting a second latency time of the second media stream. The operations of 1410 may be performed in accordance with examples as disclosed herein. In some examples, aspects of the operations of 1410 may be performed by a buffering component 1030 as described with reference to FIG. 10.

At 1415, the method may include transmitting a mixed media stream including the buffered first media stream mixed with the buffered second media stream to a second wireless device. The operations of 1415 may be performed in accordance with examples as disclosed herein. In some examples, aspects of the operations of 1415 may be performed by a mixed signal output component 1035 as described with reference to FIG. 10.

At 1420, the method may include terminating the first media stream associated with the first media mode. The operations of 1420 may be performed in accordance with examples as disclosed herein. In some examples, aspects of the operations of 1420 may be performed by an audio signal termination component 1040 as described with reference to FIG. 10.

At 1425, the method may include transitioning from operating in a dual-media mode in which the first media stream and the second media stream are classified as independent from each other to operating in a single media mode based on terminating the first media stream. The operations of 1425 may be performed in accordance with examples as disclosed herein. In some examples, aspects of the operations of 1425 may be performed by an audio mode transition component 1050 as described with reference to FIG. 10.

Figure 14:
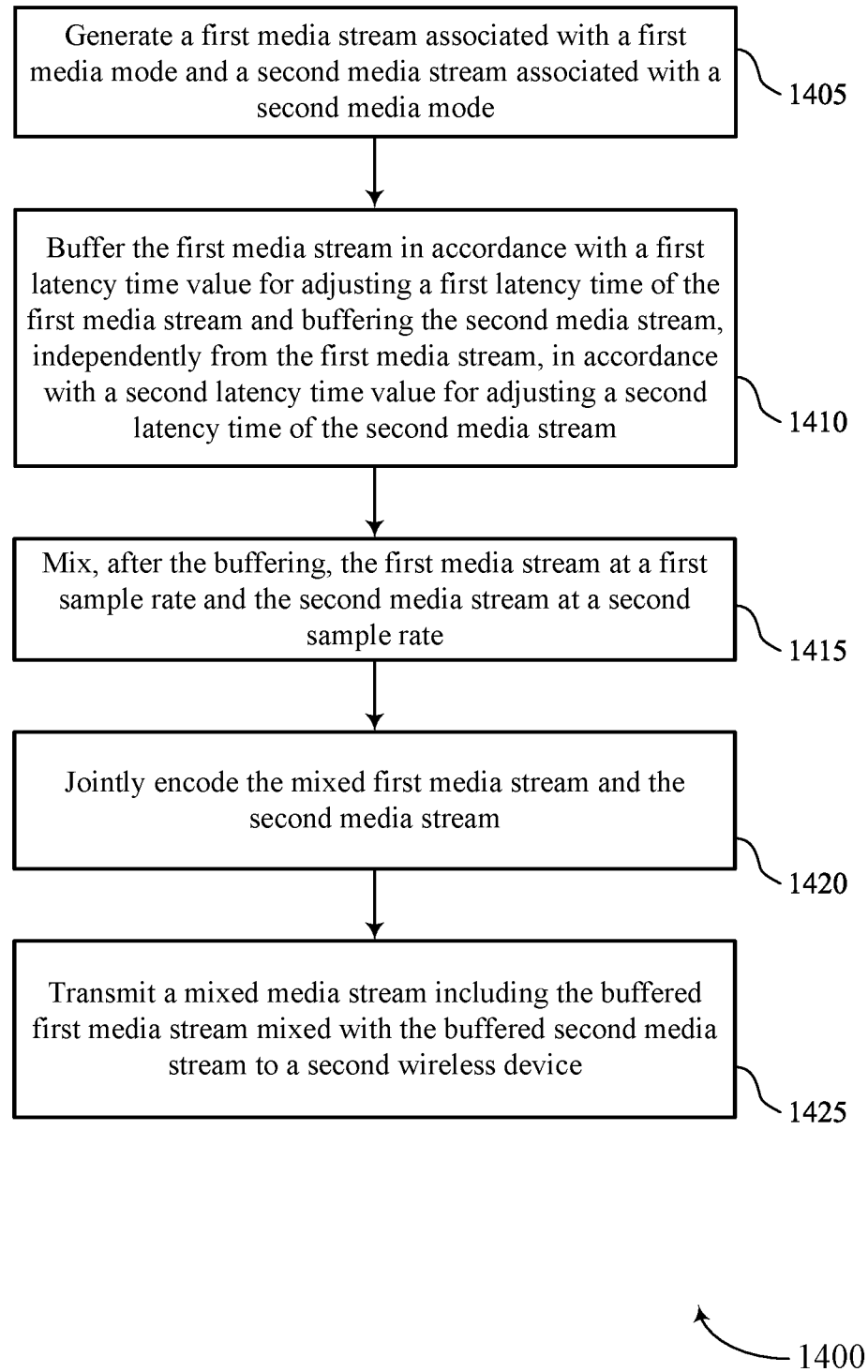

FIG. 14 shows a flowchart illustrating a method 1400 that supports seamless transitions between media modes in accordance with one or more aspects of the present disclosure. The operations of the method 1400 may be implemented by a wireless device or its components as described herein. For example, the operations of the method 1400 may be performed by a wireless device as described with reference to FIGS. 1 through 11. In some examples, a wireless device may execute a set of instructions to control the functional elements of the wireless device to perform the described functions. Additionally, or alternatively, the wireless device may perform aspects of the described functions using special-purpose hardware.

At 1405, the method may include generating a first media stream associated with a first media mode and a second media stream associated with a second media mode. The operations of 1405 may be performed in accordance with examples as disclosed herein. In some examples, aspects of the operations of 1405 may be performed by an audio signal transmission component 1025 as described with reference to FIG. 10.

At 1410, the method may include buffering the first media stream in accordance with a first latency time value for adjusting a first latency time of the first media stream and buffering the second media stream, independently from the first media stream, in accordance with a second latency time value for adjusting a second latency time of the second media stream. The operations of 1410 may be performed in accordance with examples as disclosed herein. In some examples, aspects of the operations of 1410 may be performed by a buffering component 1030 as described with reference to FIG. 10.

At 1415, the method may include mixing, after the buffering, the first media stream at a first sample rate and the second media stream at a second sample rate. The operations of 1415 may be performed in accordance with examples as disclosed herein. In some examples, aspects of the operations of 1415 may be performed by an audio stream mixing component 1055 as described with reference to FIG. 10.

At 1420, the method may include jointly encoding the mixed first media stream and the second media stream. The operations of 1420 may be performed in accordance with examples as disclosed herein. In some examples, aspects of the operations of 1420 may be performed by an encoding component 1060 as described with reference to FIG. 10.

At 1425, the method may include transmitting a mixed media stream including the buffered first media stream mixed with the buffered second media stream to a second wireless device. The operations of 1425 may be performed in accordance with examples as disclosed herein. In some examples, aspects of the operations of 1425 may be performed by a mixed signal output component 1035 as described with reference to FIG. 10.

The following provides an overview of aspects of the present disclosure:

Aspect 1: A method for wireless communication at a first wireless device, comprising: generating a first media stream associated with a first media mode and a second media stream associated with a second media mode; buffering the first media stream in accordance with a first latency time value for adjusting a first latency time of the first media stream and buffering the second media stream, independently from the first media stream, in accordance with a second latency time value for adjusting a second latency time of the second media stream; and transmitting a mixed media stream including the buffered first media stream mixed with the buffered second media stream to a second wireless device.

Aspect 2: The method of aspect 11, further comprising: terminating the second media stream associated with the second media mode; and increasing, in response to terminating the second media stream, a latency of the first independent media stream.

Aspect 3: The method of any of aspects 11 through 22, further comprising: terminating the first media stream associated with the first media mode; and transitioning from operating in a dual-media mode in which the first media stream and the second media stream are classified as independent from each other to operating in a single media mode based at least in part on terminating the first media stream.

Aspect 4: The method of any of aspects 11 through 33, further comprising: mixing, after the buffering, the first media stream at a first sample rate and the second media stream at a second sample rate; and jointly encoding the mixed first media stream and the second media stream.

Aspect 5: The method of aspect 44, further comprising: setting the first latency time value associated with the first media stream based at least in part on the first sample rate; and resizing and shifting the second media stream between a transmission state at the first wireless device and an encoder input at the first wireless device.

Aspect 6: The method of aspect 55, further comprising: inserting an overlap add packet block into the first media stream and the second media stream prior to the mixing, wherein the overlap add packet block is associated with transitioning from operating in a dual-media mode in which the first media stream and the second media stream are classified as independent from each other to operating in a single media mode.

Aspect 7: The method of aspect 46, wherein mixing the first media stream and the second media stream comprises mixing the first media stream and the second media stream at a third sample rate prior to the mixing.

Aspect 8: The method of any of aspects 11 through 77, further comprising: refraining from jointly encoding the first media stream and the second media stream for a duration of the second latency time value.

Aspect 9: The method of aspect 88, further comprising: disabling a first target wake time associated with the first media stream prior to mixing the first media stream at a first sample rate and the second media stream at a second sample rate; enabling a second target wake time associated with the first media stream; and mixing the first media stream and the second media stream based at least in part on the second target wake time.

Aspect 10: The method of aspect 99, further comprising: enabling the second target wake time associated with the first media stream; and encoding the first media stream based at least in part on the second target wake time.

Aspect 11: The method of any of aspects 11 through 1010, wherein the first media mode comprises a high quality mode and the second media mode comprises a low-latency mode.

Aspect 12: The method of any of aspects 11 through 1011, wherein the first wireless device comprises a media source device and the second wireless device comprises a media sink device.

Aspect 13: An apparatus for wireless communication at a first wireless device, comprising a processor; memory coupled with the processor; and instructions stored in the memory and executable by the processor to cause the apparatus to perform a method of any of aspects 11 through 1212.

Aspect 14: An apparatus for wireless communication at a first wireless device, comprising at least one means for performing a method of any of aspects 11 through 1212.

Aspect 15: A non-transitory computer-readable medium storing code for wireless communication at a first wireless device, the code comprising instructions executable by a processor to perform a method of any of aspects 11 through 1212.

It should be noted that the methods described herein describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, WLAN 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first wireless device, comprising:
    generating a first media stream associated with a first media mode and a second media stream associated with a second media mode;
    buffering the first media stream in accordance with a first latency time value for adjusting a first latency time of the first media stream and buffering the second media stream, independently from the first media stream, in accordance with a second latency time value for adjusting a second latency time of the second media stream;
    transmitting a mixed media stream including the buffered first media stream mixed with the buffered second media stream to a second wireless device;
    mixing, after the buffering, the first media stream at a first sample rate and the second media stream at a second sample rate;
    jointly encoding the mixed first media stream and the second media stream;
    setting the first latency time value associated with the first media stream based at least in part on the first sample rate; and
    resizing and shifting the second media stream between a transmission state at the first wireless device and an encoder input at the first wireless device.

2. The method of claim 1, further comprising:
    terminating the second media stream associated with the second media mode; and
    increasing, in response to terminating the second media stream, a latency of the first media stream.

3. The method of claim 1, further comprising:
    terminating the first media stream associated with the first media mode; and
    transitioning from operating in a dual-media mode in which the first media stream and the second media stream are classified as independent from each other to operating in a single media mode based at least in part on terminating the first media stream.

4. The method of claim 1, further comprising:
    inserting an overlap add packet block into the first media stream and the second media stream prior to the mixing, wherein the overlap add packet block is associated with transitioning from operating in a dual-media mode in which the first media stream and the second media stream are classified as independent from each other to operating in a single media mode.

5. The method of claim 1, wherein mixing the first media stream and the second media stream comprises mixing the first media stream and the second media stream at a third sample rate prior to the mixing.

6. The method of claim 1, wherein the first media mode comprises a high quality mode and the second media mode comprises a low-latency mode.

7. The method of claim 1, wherein the first wireless device comprises a media source device and the second wireless device comprises a media sink device.

8. A method for wireless communication at a first wireless device, comprising:

generating a first media stream associated with a first media mode and a second media stream associated with a second media mode;

buffering the first media stream in accordance with a first latency time value for adjusting a first latency time of the first media stream and buffering the second media stream, independently from the first media stream, in accordance with a second latency time value for adjusting a second latency time of the second media stream;

transmitting a mixed media stream including the buffered first media stream mixed with the buffered second media stream to a second wireless device;

refraining from jointly encoding the first media stream and the second media stream for a duration of the second latency time value;

disabling a first target wake time associated with the first media stream prior to mixing the first media stream at a first sample rate and the second media stream at a second sample rate;

enabling a second target wake time associated with the first media stream; and mixing the first media stream and the second media stream based at least in part on the second target wake time.

9. The method of claim 8, further comprising:

enabling the second target wake time associated with the first media stream; and encoding the first media stream based at least in part on the second target wake time.

10. An apparatus for wireless communication at a first wireless device, comprising:

a processor;

memory coupled with the processor; and instructions stored in the memory and executable by the processor to cause the apparatus to:

generate a first media stream associated with a first media mode and a second media stream associated with a second media mode;

buffer the first media stream in accordance with a first latency time value for adjusting a first latency time of the first media stream and to buffer the second media stream, independently from the first media stream, in accordance with a second latency time value for adjusting a second latency time of the second media stream;

transmit a mixed media stream including the buffered first media stream mixed with the buffered second media stream to a second wireless device;

mix, in time and after the buffering, the first media stream at a first sample rate and the media stream at a second sample rate;

jointly encode the first media stream and the second media stream;

set the first latency time value associated with the first media stream based at least in part on the first sample rate; and resize and shift the second media stream between a transmission state at the first wireless device and an encoder input at the first wireless device.

11. The apparatus of claim 10, wherein the instructions are further executable by the processor to cause the apparatus to:

terminate the second media stream associated with the second media mode; and increase, in response to terminating the second media stream, a latency of the first media stream.

12. The apparatus of claim 10, wherein the instructions are further executable by the processor to cause the apparatus to:

terminate the first media stream associated with the first media mode; and transition from operating in a dual-media mode in which the first media stream and the second media stream are classified as independent from each other to operating in a single media mode based at least in part on terminating the first media stream.

13. The apparatus of claim 10, wherein the instructions are further executable by the processor to cause the apparatus to:

insert an overlap add packet block into the first media stream and the second media stream prior to the mixing, wherein the overlap add packet block is associated with transitioning from operating in a dual-media mode in which the first media stream and the second media stream are classified as independent from each other to operating in a single media mode.

14. The apparatus of claim 10, wherein mixing the first media stream and the second media stream comprises mixing the first media stream and the second media stream at a third sample rate prior to the mixing.

15. The apparatus of claim 10, wherein the first media mode comprises a high quality mode and the second media mode comprises a low-latency mode.

16. The apparatus of claim 10, wherein the first wireless device comprises a media source device and the second wireless device comprises a media sink device.

17. An apparatus for wireless communication at a first wireless device, comprising:

a processor;

memory coupled with the processor; and instructions stored in the memory and executable by the processor to cause the apparatus to:

generate a first media stream associated with a first media mode and a second media stream associated with a second media mode;

buffer the first media stream in accordance with a first latency time value for adjusting a first latency time of the first media stream and to buffer the second media stream, independently from the first media stream, in accordance with a second latency time value for adjusting a second latency time of the second media stream;

transmit a mixed media stream including the buffered first media stream mixed with the buffered second media stream to a second wireless device;

refrain from jointly encoding the first media stream and the second media stream for a duration of the second latency time value;

disable a first target wake time associated with the first media stream prior to mixing the first media stream at a first sample rate and the second media stream at a second sample rate;

enable a second target wake time associated with the first media stream; and mix, in time, the first media stream and the second media stream based at least in part on the second target wake time.

18. The apparatus of claim 17, wherein the instructions are further executable by the processor to cause the apparatus to:

enable the second target wake time associated with the first media stream; and encode the first media stream based at least in part on the second target wake time.

19. An apparatus for wireless communication at a first wireless device, comprising:
means for generating a first media stream associated with a first media mode and a second media stream associated with a second media mode;
means for buffering the first media stream in accordance with a first latency time value, for adjusting a first latency time of the first media stream, and for buffering the second media stream in accordance with a second latency time value for adjusting a second latency time of the second media stream;
means for transmitting a mixed media stream including the buffered first media stream mixed with the buffered second media stream to a second wireless device;
means for mixing, in time and after the buffering, the first media stream at a first sample rate and the second media stream at a second sample rate;
means for jointly encoding the first media stream and the second media stream;
means for setting the first latency time value associated with the first media stream based at least in part on the first sample rate; and
means for resizing and shifting the second media stream between a transmission state at the first wireless device and an encoder input at the first wireless device.

20. The apparatus of claim 19, further comprising:
means for terminating the second media stream associated with the second media mode; and
means for increasing, in response to terminating the second media stream, a latency of the first media stream.

21. The apparatus of claim 19, further comprising:
means for terminating the first media stream associated with the first media mode; and
means for transitioning from operating in a dual-media mode in which the first media stream and the second media stream are classified as independent from each other to operating in a single media mode based at least in part on terminating the first media stream.

22. A non-transitory computer-readable medium storing code for wireless communication at a first wireless device, the code comprising instructions executable by a processor to:
generate a first media stream associated with a first media mode and a second media stream associated with a second media mode;
buffer the first media stream in accordance with a first latency time value for adjusting a first latency time of the first media stream and to buffer the second media stream in accordance with a second latency time value for adjusting a second latency time of the second media stream;
transmit a mixed media stream including the buffered first media stream mixed with the buffered second media stream to a second wireless device;
mix, in time and after the buffering, the first media stream at a first sample rate and the media stream at a second sample rate;
jointly encode the first media stream and the second media stream;
set the first latency time value associated with the first media stream based at least in part on the first sample rate; and
resize and shift the second media stream between a transmission state at the first wireless device and an encoder input at the first wireless device.

* * * * *